United States Patent
Yu et al.

(10) Patent No.: US 8,149,870 B2
(45) Date of Patent: Apr. 3, 2012

(54) METHOD AND APPARATUS FOR FORWARDING DATA IN ETHERNET

(75) Inventors: Yang Yu, Hangzhou (CN); Jianming Ding, Hangzhou (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 603 days.

(21) Appl. No.: 12/323,053

(22) Filed: Nov. 25, 2008

(65) Prior Publication Data

US 2009/0196287 A1   Aug. 6, 2009

Related U.S. Application Data

(63) Continuation of application No. PCT/CN2007/070077, filed on Jun. 1, 2007.

(30) Foreign Application Priority Data

| Jun. 2, 2006 | (CN) | 2006 1 0083694 |
| Sep. 7, 2006 | (CN) | 2006 1 0151773 |
| Oct. 26, 2006 | (CN) | 2006 1 0142814 |
| Jan. 18, 2007 | (CN) | 2007 1 0002094 |

(51) Int. Cl.
  *H04J 3/16* (2006.01)
(52) U.S. Cl. .......... 370/466; 370/386; 370/395.53
(58) Field of Classification Search .......... 370/389, 370/392, 401, 395.53, 465, 466
  See application file for complete search history.

(56) References Cited

U.S. PATENT DOCUMENTS

| 5,887,001 A * | 3/1999 | Russell | 714/726 |
| 7,110,397 B1 * | 9/2006 | Abe et al. | 370/389 |
| 7,178,157 B1 * | 2/2007 | Kimura et al. | 725/38 |
| 7,684,340 B2 * | 3/2010 | Liu et al. | 370/249 |
| 2005/0135413 A1 | 6/2005 | Kewei et al. | 370/463 |
| 2007/0110085 A1 * | 5/2007 | Jiang et al. | 370/403 |

FOREIGN PATENT DOCUMENTS

| CN | 1356806 | 7/2002 |
| CN | 1472928 | 2/2004 |

OTHER PUBLICATIONS

International Preliminary Report on Patentability for Application No. PCT/CN2007/070077, dated Dec. 3, 2008.
International Search Report for Application No. PCT/CN2007/070077, dated Sep. 6, 2007.

* cited by examiner

*Primary Examiner* — Hassan Kizou
*Assistant Examiner* — Emmanuel Maglo
(74) *Attorney, Agent, or Firm* — Marshall, Gerstein & Borun LLP

(57) ABSTRACT

The present invention provides a method for forwarding data in the Ethernet, an Ethernet physical layer cross apparatus, an Ethernet Media Access Control (MAC) layer cross apparatus, an Ethernet IP layer cross apparatus and cross cascade systems. In the method of the present invention includes the following features: configuring cross relationships between network device interfaces; determining whether an interface has a cross relationship with other interfaces according to the cross relationships configured after receiving data from the interface; sending the data to an interface which has a cross relationship with the interface from which the data is received if the interface from which the data is received has a cross relationship with other interfaces; and proceeding with existing forwarding processing in each layer if the interface from which the data is received does not have a cross relationship with other interfaces. The solution of the present invention dramatically reduces workload of network devices in the Ethernet and improves forwarding performance of the network devices.

21 Claims, 13 Drawing Sheets

METHOD AND APPARATUS FOR FORWARDING DATA IN ETHERNET

CROSS-REFERENCE TO RELATED APPLICATIONS

This is a continuation of International Application PCT/CN2007/070077 filed Jun. 1, 2007, which in turn claims the priority of Chinese Application No. 200610083694.5 filed Jun. 2, 2006, Chinese Application No. 200610151773.5 filed Sep. 7, 2006, Chinese Application No. 200610142814.4 filed Oct. 26, 2006, and Chinese Application No. 200710002094.5 filed Jan. 18, 2007 the entire respective disclosures of which are incorporated herein by reference.

FIELD OF THE INVENTION

The present invention relates to network communication technologies, and more particularly, to method and apparatus for forwarding data in Ethernet.

BACKGROUND OF THE INVENTION

Currently, Ethernet technologies are widely applied. In an Ethernet, data are processed in turn in the physical layer, the Media Access Control (MAC) layer and the IP layer when being forwarded.

The processing at the physical layer may be implemented by a physical layer apparatus of a network device, such as a dedicated physical layer processing chip. Specifically, the structure of the physical layer apparatus may be characterized into two types. The first type of the structure is shown in FIG. 1. In such a case, the physical layer apparatus is a physical layer standard apparatus. The physical layer apparatus includes a plurality of analog interfaces (may also be called physical ports) on a user side, analog/digital (A/D) conversion units respectively corresponding to the analog interfaces, clock and coding/decoding processing units respectively corresponding to each analog interface, MAC layer interface processing units respectively corresponding to each analog interface, and digital interfaces respectively corresponding to each analog interface. It can be seen from FIG. 1 that, in the physical layer standard apparatus, the number of the analog interfaces is equal to that of the digital interfaces. The second type of structure is shown in FIG. 2. In such a case, the apparatus is a physical layer multiplexing apparatus. The physical layer multiplexing apparatus includes a plurality of analog interfaces on the user side, analog/digital conversion units respectively corresponding to each analog interface, clock and coding/decoding processing units respectively corresponding to each analog interface, MAC layer processing units corresponding to each analog interface, a multiplex and de-multiplex processing unit and a multiplexed digital interface. It can be seen from FIG. 2 that, the physical layer multiplexing apparatus has the multiplex and de-multiplex processing unit which is capable of performing multiplex processing to data outputted from each analog interface and performing de-multiplex processing to multiplexed data to be sent to each analog interface. Therefore, the digital interfaces may be multiplexed, which dramatically reduces the number of the digital interfaces.

The processing at the MAC layer may be implemented by a MAC layer apparatus of the network device, such as a dedicated MAC layer processing chip. The structure of the MAC layer apparatus is shown in FIG. 3. The MAC layer apparatus includes a plurality of digital interfaces connected with a previous level apparatus, a MAC layer access control unit and a MAC layer logical link layer unit. The MAC layer apparatus may further include an IP layer interface unit. The processing at the IP layer may be implemented by an IP layer apparatus of the network device, such as a dedicated IP layer processing chip. The structure of the IP layer apparatus is shown in FIG. 4. The IP layer apparatus includes a plurality of digital interfaces connected with a previous level apparatus and an IP layer processing unit.

FIG. 5 is a flowchart illustrating a conventional process of data forwarding. As shown in FIGS. 1 to 5, data is processed in turn in the physical layer, MAC layer and IP layer when being forwarded in the Ethernet. The process mainly includes the following processes.

Block 501: After receiving data, each analog interface such as analog interface 1 and analog interface 2 of a physical layer apparatus in a network device sends the data to A/D conversion unit 1 and A/ID conversion unit 2, respectively.

Block 502: The A/D conversion units 1 and 2 convert the data received in form of analog signals into data in the form of digital signals, and send the converted data to clock and coding/decoding units 1 and 2, respectively.

Block 503: The clock and coding/decoding units 1 and 2 perform clock and coding/decoding processing to the data received, and send the processed data to MAC layer interface processing units 1 and 2.

Block 504: The MAC layer interface processing units 1 and 2 perform various MAC layer interface processing to the data received, and send the processed data to digital interfaces. The digital interfaces respectively send the processed data to digital interfaces of a next level MAC layer apparatus.

In this Block, if the physical layer apparatus is the physical layer standard apparatus as shown in FIG. 1, the MAC layer interface processing units 1 and 2 send the processed data to the digital interfaces 1 and 2 respectively. The digital interfaces 1 and 2 respectively send the data received to the digital interfaces 1 and 2 of the MAC layer apparatus shown in FIG. 3.

If the physical layer apparatus is the physical layer multiplexing apparatus as shown in FIG. 2, the MAC layer interface processing units 1 and 2 respectively send the processed data to the multiplex and de-multiplex processing unit. The multiplex and de-multiplex processing unit multiplexes the data received and sends the multiplexed data to the multiplexed digital interface. The multiplexed digital interface sends the data received to a digital interface of the MAC layer apparatus shown in FIG. 3.

Block 505: In the MAC layer apparatus, the data is processed by the digital interfaces, MAC layer access control unit, MAC layer logical link layer unit and IP layer interface unit before being sent out.

In this Block, if the network device which receives the data is a layer-2 network device, the network device will find an out interface according to MAC address in the data after the processing of the MAC layer apparatus, and then forward the data to another network device utilizing this out interface. The process shown in FIG. 5 is finished.

If the network device which receives the data is a layer-3 network device, the data are continued to be sent to the IP layer apparatus in the network device after the processing of the MAC layer apparatus in this Block. Then, Block 506 is performed.

Block 506: The digital interfaces in the IP layer apparatus send the data received to the IP layer processing unit. The IP layer processing unit searches for a path according to IP address in the data and sends the data to other network devices according to the search result.

FIG. 5 illustrates a processing of uplink direction, i.e. from the physical layer to the MAC layer or the IP layer. The processes of the downlink direction, i.e. from the IP layer or the MAC layer to the physical layer are conversed to those shown in FIG. 5.

It can be seen from the processes shown in FIG. 5 that, in any of the conventional network devices in the Ethernet, after receiving the data from a user terminal, the physical layer apparatus always performs various processing to the data before sending the data to the MAC layer apparatus. The MAC layer apparatus analyzes the MAC address of the data and sends the data to another network device according to the MAC address. Alternatively, the MAC layer apparatus sends the data to the IP layer apparatus. The IP layer apparatus analyzes the IP address of the data and sends the data to another network device according to the IP address. It can be seen that, in the conventional method, for data between any two user terminals in communication, the network device in the Ethernet needs to search for a path for forwarding the data according to address information carried by the data. In other words, by utilizing the conventional the physical layer processing, MAC layer processing and IP layer processing, the data are forwarded by the network device with the method of addressed forwarding. Thus, it is necessary for the network device to perform a series of processing in the physical layer and MAC layer and further in the IP layer for all data, which dramatically increases the workload of the network device and decreases the forwarding performance of the network device.

In addition, in the Ethernet, since the network device forwards the data between the user terminals with the method of the addressed forwarding, the network device is required to acquire and store address information of all user terminals whose data have been forwarded by the network device, which occupies a lot of storage resources of the network device and puts forward high requirements for the network device.

SUMMARY

Embodiments of the present invention provide a Ethernet physical layer cross apparatus, Ethernet MAC layer cross apparatus, Ethernet IP layer cross apparatus, Ethernet physical layer cross cascade system, Ethernet MAC layer cross cascade system, Ethernet IP layer cross cascade system and a method for forwarding data in the Ethernet, so as to reduce workload of the network device in the Ethernet and improve the forwarding performance of the network device.

The solution of the present invention is as follows:

An Ethernet physical layer cross apparatus, includes: a plurality of analog interfaces, a plurality of digital interfaces respectively corresponding to each of the analog interfaces. The Ethernet physical layer cross apparatus further comprises a cross processing unit; wherein the cross processing unit is configured to save cross relationships between network device interfaces;

send data outputted from a first analog interface to a second analog interface if determining that the first analog interface has a cross relationship with the second analog interface according to the cross relationships saved after receiving the data from the first analog interface; and send the data outputted from the first analog interface to a digital interface corresponding to the first analog interface if determining that the first analog interface does not have a cross relationship with other analog interfaces according to the cross relationships saved.

Another Ethernet physical layer cross apparatus includes: a plurality of analog interfaces and a first multiplex and de-multiplex processing unit. The Ethernet physical layer cross apparatus further comprises:

a cross processing unit, and a multiplex interface connected with the first multiplex and de-multiplex processing unit and an outside apparatus; wherein the cross processing unit is configured to save cross relationships between network device interfaces;

send data output from a first analog interface to a second analog interface if determining that the first analog interface has a cross relationship with the second analog interface according to the cross relationships saved when receiving the data outputted from the first analog interface; and send the data outputted from the first analog interface to the first multiplex and de-multiplex processing unit if determining that the first analog interface does not have a cross relationship with other analog interfaces according to the cross relationships saved.

An Ethernet MAC layer cross apparatus includes: a plurality of digital interfaces and a MAC layer access control unit. The Ethernet MAC layer cross apparatus further comprises: a first multiplex and de-multiplex processing unit and a cross processing unit; wherein the first multiplex and de-multiplex processing unit is configured to de-multiplex data outputted from the digital interfaces, send the de-multiplexed data to the cross processing unit, and send data requiring to be crossed with a previous level apparatus received from the cross processing unit to a corresponding digital interface; and the cross processing unit is configured to save cross relationships between network device interfaces, send the data requiring to be crossed with the previous level apparatus and information of the an interface corresponding to the data requiring to be crossed with the previous level apparatus to the first multiplex and de-multiplex processing unit if determining that the interface corresponding to de-multiplexed data requires to be crossed with the previous level apparatus according to the cross relationships saved, and send the data to the MAC layer access control unit if determining that the interface corresponding to the de-multiplexed data does not have a cross relationship with other digital interfaces.

An Ethernet IP layer cross apparatus includes: a plurality of digital interfaces and an IP layer processing unit. The Ethernet IP layer cross apparatus further comprises: a first multiplex and de-multiplex processing unit and a cross processing unit; wherein the first multiplex and de-multiplex processing unit is configured to de-multiplex data outputted from the digital interfaces, send de-multiplexed data to the cross processing unit, and send data requiring to be crossed with a previous level apparatus received from the cross processing unit to a corresponding digital interface; and the cross processing unit is configured to save cross relationships between network device interfaces, send the data requiring to be crossed with the previous level apparatus and information of an interface corresponding to the data requiring to be crossed with the previous level apparatus to the first multiplex and de-multiplex processing unit if determining that the interface corresponding to the de-multiplexed data requires to be crossed with the previous level apparatus according to the cross relationships saved, and send the data to the IP layer processing unit if determining that interface corresponding to the de-multiplexed data does not have a cross relationship with other digital interfaces.

An Ethernet physical layer cross cascade system includes: a first level Ethernet physical layer cross apparatus and at least one next level Ethernet physical layer cross apparatus. Both the first level and next level Ethernet physical layer cross apparatuses include a plurality of analog interfaces and a first multiplex and de-multiplex processing unit and further include a cross processing unit, and a multiplex interface connected with the first multiplex and de-multiplex processing unit and an outside apparatus. The first multiplex and de-multiplex processing unit includes a multiplex and de-multiplex processing unit of a cross interface and a multiplex and de-multiplex processing unit of a forwarding interface; and the multiplex interface includes a cross multiplex interface connected with the multiplex and de-multiplex processing unit of the cross interface and a forwarding multiplex interface connected with the multiplex and de-multiplex processing unit of the forwarding interface.

The cross processing unit is configured to save cross relationships between network device interfaces; send data output from a first analog interface to a second analog interface if determining that the first analog interface has a cross relationship with the second analog interface according to the cross relationships saved when receiving the data outputted from the first analog interface; and send the data outputted from the first analog interface to the multiplex and de-multiplex processing unit of the forwarding interface if determining that the first analog interface does not have a cross relationship with other analog interfaces according to the cross relationships saved. The cross processing unit is further configured to send the data to the multiplex and de-multiplex processing unit of the cross interface if determining that the first analog interface has a cross relationship with the cross multiplex interface according to the cross relationships saved.

The next level Ethernet physical layer cross apparatus further includes: a second multiplex and de-multiplex processing unit, coupled with the analog interfaces and the cross processing unit, configured to de-multiplex multiplexed data received from each analog interface, send de-multiplexed data to the cross processing unit, and send data requiring to be crossed with a previous level apparatus from the cross processing unit to a corresponding analog interface.

The cross processing unit is further configured to send the data requiring to be crossed with the previous level apparatus and information of the analog interface corresponding to the data requiring to be crossed with the previous level apparatus to the second multiplex and de-multiplex processing unit if determining that the interface corresponding to the de-multiplexed data requires to be crossed with the previous level apparatus according to the cross relationships saved.

A method for forwarding data in the Ethernet includes:

configuring cross relationships between network device interfaces;

determining whether an interface has a cross relationship with other interfaces according to the cross relationships configured after receiving data from the interface;

sending the data to an interface which has a cross relationship with the interface from which the data is received if the interface from which the data is received has a cross relationship with other interfaces; and proceeding with existing forwarding processing in each layer if the interface from which the data is received does not have a cross relationship with other interfaces.

An Ethernet apparatus includes: at least one Ethernet-based first cross interface, at least one Ethernet-based second cross interface, and a cross processing unit; wherein the cross processing unit is configured to exchange data between the first cross interface and the second cross interface according to cross relationships configured.

It can be seen from the above that, in embodiments of the present invention, the network devices in the Ethernet can directly perform cross processing between interfaces to the data between user terminals having a fixed path relationship. If the cross processing is implemented in the physical layer apparatus, it is no need to perform subsequent physical layer processing, MAC layer processing and IP layer processing to the data. If the cross processing is implemented in the MAC layer apparatus, it is no need to perform subsequent MAC layer processing and IP layer processing to the data. If the cross processing is implemented in the IP layer apparatus, it is no need to perform the subsequent IP layer processing. Therefore, no matter which kind of cross processing is performed in present invention, the workload of the network devices can be dramatically reduced and the forwarding performance of the network devices can be improved.

Furthermore, since the network devices in the Ethernet can directly perform cross processing between interfaces to the data forwarded between user terminals having the fixed path relationship, the addressed forwarding is no longer required. Thus, for the user terminals having the fixed path relationship, the network devices need not to acquire or store address information of the user terminals, which saves a lot of storage resources of the network devices and lowers the requirements for the network devices.

In addition, in the present invention, multiple types of cross modes including local cross and cascade cross of the physical layer apparatus, MAC layer apparatus and IP layer apparatus may be implemented, which greatly improves the flexibility of the present invention and meets the requirements of all kinds of services.

Further, in embodiments of the present invention, direct connection of services is implemented through the cross processing to the data in the Ethernet. Since IP technologies are low-cost nowadays, embodiments of the present invention cost less and have a good prospect compared with data cross services in other networks.

DETAILED DESCRIPTION OF THE INVENTION

Actually, there is no fixed path relationship between two user terminals in most cases. In other words, the two user terminals can not be connected through fixed network device interfaces. For example, mobile phone A of a user may access a network through different access devices and communicate with different mobile phones. In this case, it is necessary to perform addressed forwarding utilizing the existing physical layer processing, MAC layer processing and IP layer processing.

Figure 6:
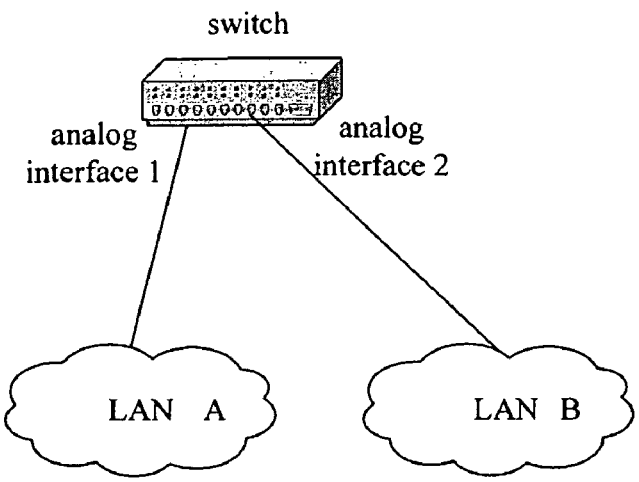
FIG. 6 is a schematic diagram illustrating one type of connections between user terminals having fixed path relationships in different Local Area Networks (LANs)

In actual practice, there always exists a fixed path relationship between two user terminals in most cases. In other words, the two user terminals can be connected through fixed network device interfaces. During each communication, data of a user terminal may be sent to another user terminal through a fixed path. As shown in FIG. 6, there are two offices for one service, one is in LAN A and the other is in LAN B. User terminals in LAN A and LAN B are connected through fixed interfaces of a switch. Since LAN A and LAN B are two offices of one service, the user terminal in LAN A and the user terminal in LAN B have a fixed path relationship, i.e. data sent from the user terminal in LAN A is transmitted to the LAN B, and data received by the user terminal in LAN A is sent from the LAN B; data sent from the user terminal in LAN B is transmitted to the LAN A, and data received by the user terminal in LAN B is sent from the LAN A. For the data between the user terminals having the fixed path relationship, it is possible for the network device to directly forward the data through the fixed interfaces to which the user terminals are connected rather than performing the addressed forwarding by a series of physical layer processing, MAC layer processing and IP layer processing.

Figure 7:
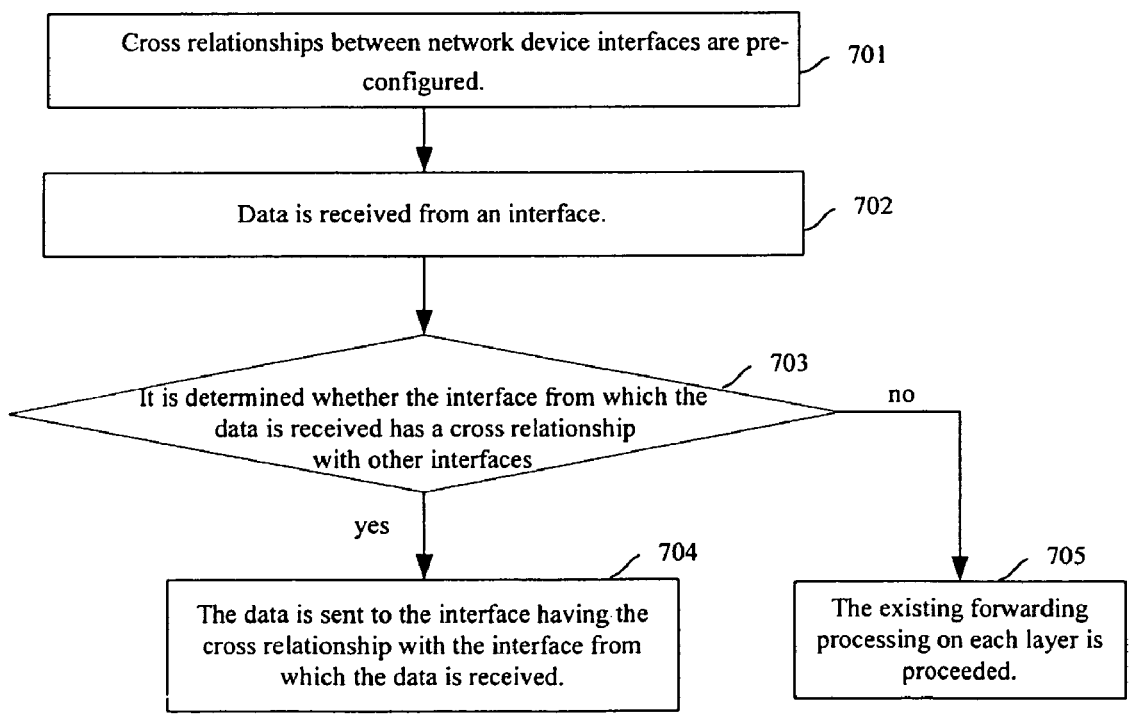
FIG. 7 is a simplified flowchart illustrating a process of data forwarding according to an embodiment of the present invention.

In respect of the foregoing features, embodiments of the present invention provide a method for forwarding data. As shown in FIG. 7, the method includes the following processes.

Block 701: Cross relationships between network device interfaces are pre-configured.

In this Block, the cross relationships between the network device interfaces may be configured as follows. A first user terminal and a second user terminal having a fixed path relationship are determined. A cross relationship between a first interface of the network device connected with the first user terminal and a second interface of the network device connected with the second user terminal is configured. For example, as shown in FIG. 6, the user terminal in LAN A and the user terminal in LAN B have the fixed path relationship. The user terminal in LAN A is connected to analog interface 1 of the switch, and the user terminal in LAN B is connected to analog interface 2 of the switch. Thus, it can be determined that the analog interface 1 and the analog interface 2 have the cross relationship.

Block 702: Data is received from an interface.

Block 703: It is determined whether the interface from which the data is received has a cross relationship with other interfaces according to the cross relationships configured. If yes, Block 704 is performed, otherwise, Block 705 is performed.

Block 704: The data is sent to an interface having the cross relationship with the interface from which the data is received, and the procedure terminated.

Herein, after being sent to the interface having the cross relationship with the interface from which the data is received, the data will be forwarded to a user terminal connected with the interface.

Block 705: The existing forwarding processing on each layer is performed.

It can be seen from the data forwarding process of FIG. 7 that, the data between the interfaces having the cross relationship may be sent directly through the cross processing. Therefore, it is no need to perform the subsequent series of forwarding and addressing processing on each layer, which dramatically reduces the workload of the network devices.

In practical, there nay be two types of fixed path relationships between the user terminals.

The first one: the user terminals having the fixed path relationship are connected to different analog interfaces of the same physical layer apparatus of the same network device.

The second one: the user terminals having the fixed path relationship are connected to different analog interfaces of different physical layer apparatuses of the same network device, or connected to different analog interfaces of different physical layer apparatuses of different network devices.

The first type of the fixed path relationship is shown in FIG. 6. For example, the user terminal in the LAN A connects to the analog interface 1 of the physical layer apparatus 1 of the switch. The user terminal in the LAN B connects to the analog interface 2 of the physical layer apparatus 1 of the switch. In this case, the cross of the data between the analog interface 1 and the analog interface 2 can be implemented in the physical layer apparatus 1 of the switch, i.e. the local cross is implemented.

Figure 8:
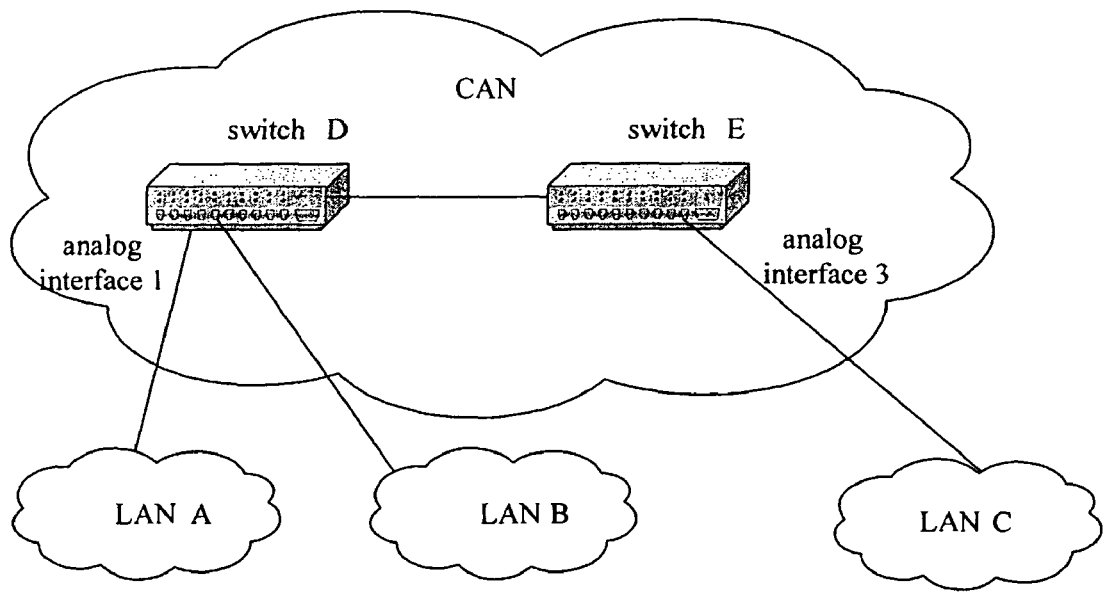
FIG. 8 is a schematic diagram illustrating another type of connections between user terminals having fixed path relationships in different LANs.

The second type of fixed path relationship is shown in FIG. 8. For example, the user terminal in the LAN A connects fixedly to analog interface 1 of switch D. The user terminal in the LAN C connects fixedly to analog interface 3 of switch E. The switch D is connected to the switch E fixedly. In such a case, although the user terminal in the LAN A has a fixed path relationship with the user terminal in the LAN C, it is impossible to realize cross in one physical layer apparatus of one switch since they are connected with different switches. Instead, the cascade relationship between the physical layer apparatus, and the MAC layer apparatus or H) layer apparatus is required for implementing the cross, i.e. the cascade cross is required.

In respect of the above two cases, in order to ensure the implementation of the cross processing no matter how the user terminals having the fixed path relationship are connected, a plurality of Ethernet physical layer cross apparatuses capable of performing cross processing may be cascaded together according to practical connections between the user terminals having the fixed path relationships. As such, each cascaded Ethernet physical layer cross apparatus can perform the processing as illustrated in FIG. 7. Additionally and alternatively, a plurality of Ethernet MAC layer cross apparatuses capable of performing the cross processing may be cascaded together. At this time, each cascaded Ethernet MAC layer cross apparatus can perform the processing as illustrated in FIG. 7. Additionally and alternatively, a plurality of Ethernet IP layer cross apparatuses capable of performing the cross processing may be cascaded together. At this time, each cascaded IP layer cross apparatus can perform the processing illustrated in FIG. 7.

Figure 1:
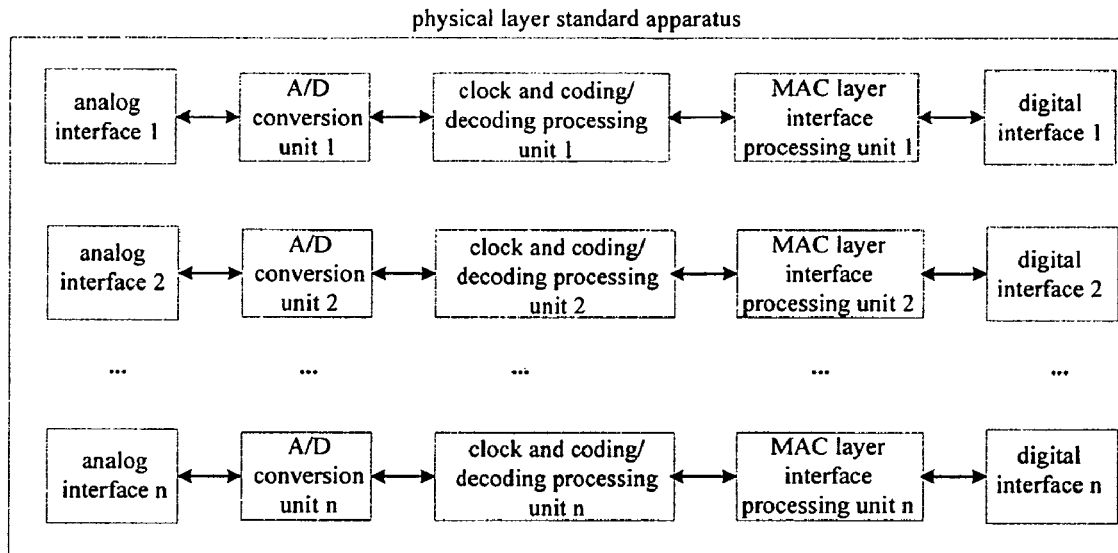
FIG. 1 is a schematic diagram illustrating structure of a conventional Ethernet physical layer standard apparatus.
Figure 2:
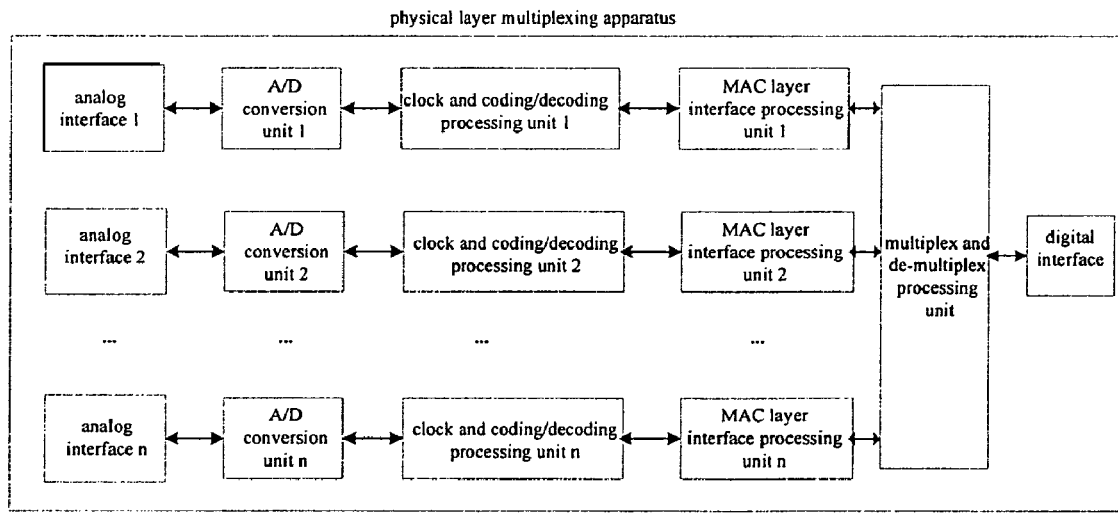
FIG. 2 is a schematic diagram illustrating structure of a conventional Ethernet physical layer multiplexing apparatus.

It should be noted that, no matter how the cross is implemented, when the Ethernet physical layer cross apparatus performs the processing illustrated in FIG. 7, clock and coding/decoding processing units corresponding to two analog interfaces perform different coding/decoding processing since, as shown in FIGS. 1 and 2, physical layer media utilized by different analog interfaces connecting different user terminals inside the physical layer apparatus may be different. For example, one analog interface is an Ethernet electronic interface, whereas the other analog interface is an Ethernet optical interface. Therefore, in order to ensure the communication between any two analog interfaces and the implementation of the data cross, the Ethernet physical layer cross apparatus may perform the processing illustrated in FIG. 7 after the clock and coding/decoding processing unit has finished all processing. In other words, between Block 702 and Block 703, the process shown in FIG. 7 further includes: the A/D conversion unit and the clock and coding/decoding processing unit in the physical layer cross apparatus perform A/D conversion processing and clock and coding/decoding processing to the data received from the analog interface.

When the Ethernet MAC layer cross apparatus or Ethernet IP layer cross apparatus performs the processing illustrated in FIG. 7, since the previous level apparatus connected with the Ethernet MAC layer cross apparatus or the IP layer cross apparatus generally performs multiplexing of data received from a plurality of analog interfaces, the Ethernet MAC layer cross apparatus or the Ethernet IP layer cross apparatus may further perform de-multiplexing of the data received from a interface before determining the cross according to the cross relationships configured.

The foregoing introduces the implementation of data cross during data forwarding of the present invention. The details for implementing the cross will be explained hereinafter with reference to apparatuses and systems provided by embodiments of the present invention.

First, embodiments of the present invention provide an Ethernet physical layer cross apparatus. The Ethernet physical layer cross apparatus is obtained by improving the existing physical layer standard apparatus shown in FIG. 1. For the purpose of description, the Ethernet physical layer cross apparatus is called Ethernet physical layer standard cross apparatus. It includes a cross processing unit connected with the analog interfaces and the digital interfaces corresponding to the analog interfaces besides the interfaces and units shown in FIG. 1.

The processing of each existing interface and unit is similar with that of the conventional method. The cross processing unit is configured to save cross relationships between network device interfaces; receive data outputted from each analog interface of the Ethernet physical layer cross apparatus. After receiving data outputted from a first analog interface, the cross processing unit forwards the data outputted from the first analog interface to a second analog interface if determining according to the cross relationships saved that the first analog interface has a cross relationship with the second analog interface; and forwards the data outputted from the first analog interface to a digital interface corresponding to the first analog interface if determining according to the cross relationships saved that the first analog interface does not have a cross relationship with other analog interfaces.

Figure 9:
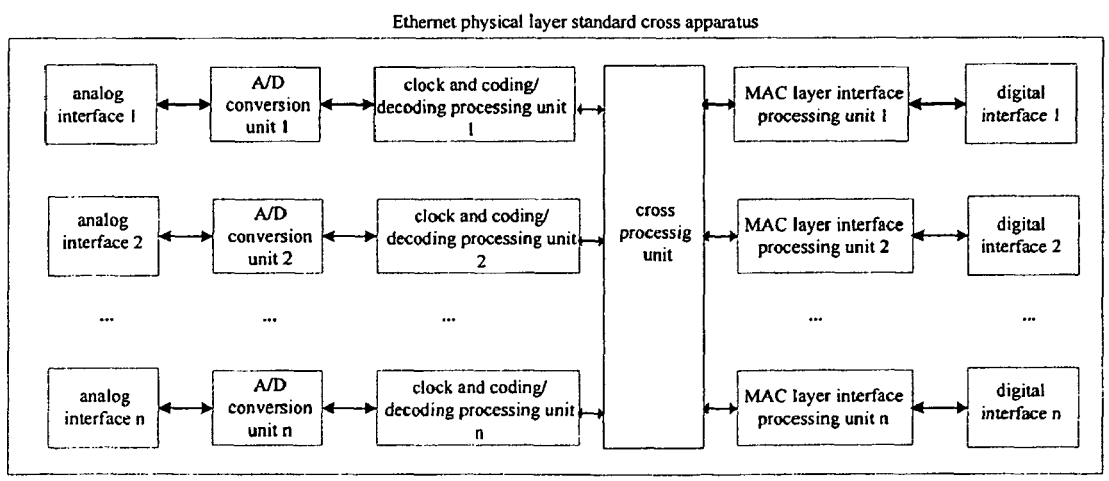
FIG. 9 is a schematic diagram illustrating structure of an Ethernet physical layer standard cross apparatus according to an embodiment of the present invention.

In the Ethernet physical layer standard cross apparatus provided by embodiments of the present invention, the cross processing unit may be connected between the analog interfaces and the digital interfaces at any location. As shown in FIG. 9, in order to ensure the communication between any two analog interfaces in any cases, the cross processing unit is preferably connected directly between the clock and coding/decoding processing units and the MAC layer interface processing units. Thus, the processing of the cross processing unit specifically includes: receiving data outputted from each analog interface through each clock and coding/decoding processing unit, sending the data to the clock and coding/decoding processing unit corresponding to the second analog interface so that the data outputted from the first analog interface can be sent to the second analog interface, or sending the data to the MAC layer interface processing unit corresponding to the first analog interface so that the data outputted from the first analog interface can be sent to the digital interface corresponding to the first analog interface.

It should be noted that, in the Ethernet physical layer standard cross apparatus shown in FIG. 9, since the number of network side interfaces, i.e. the digital interfaces, is the same as that of user terminal side interfaces, i.e. analog interfaces, it is impossible to realize large-scale cascade. In other words, the Ethernet physical layer standard cross apparatus of the present invention is not convenient for cascade cross between different physical layer apparatuses. Therefore, the Ethernet physical layer standard cross apparatus of the present invention is generally used for implementing local cross, i.e. the data cross between user terminals connected with different analog interfaces of the Ethernet physical layer standard cross apparatus.

In addition, embodiments of the present invention provide another Ethernet physical layer cross apparatus. The Ethernet physical layer cross apparatus is obtained by improving the existing physical layer multiplexing apparatus shown in FIG. 2. For the purpose of description, the Ethernet physical layer cross apparatus is generally called Ethernet physical layer multiplexing cross apparatus. It includes, besides the interfaces and units shown in FIG. 2, a cross processing unit connected with each analog interface and the first multiplex and de-multiplex processing unit, and a multiplex interface connected with the first multiplex and de-multiplex processing unit and a next level apparatus.

The processing performed by each existing interface and unit is similar as that of the conventional method. The cross processing unit is configured to save the cross relationships between the network device interfaces and receive data output from each analog interface in the Ethernet physical layer multiplexing cross apparatus. When receiving data outputted from a first analog interface, the cross processing unit sends the data outputted from the first analog interface to a second analog interface if determining that the first analog interface has a cross relationship with the second analog interface in the Ethernet physical layer multiplexing cross apparatus according to the cross relationships saved, and sends the data outputted from the first analog interface to the first multiplex and de-multiplex processing unit if determining that the first analog interface does not have a cross relationship with other analog interfaces in the Ethernet physical layer multiplexing cross apparatus.

Figure 10:
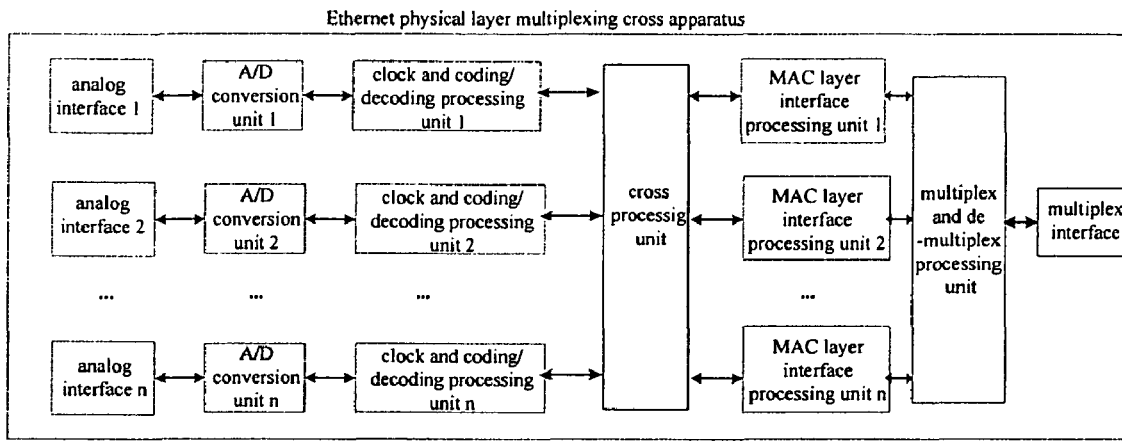
FIG. 10 is a schematic diagram illustrating structure of an Ethernet physical layer multiplexing cross apparatus according to an embodiment of the present invention.

In the Ethernet physical layer multiplexing cross apparatus provided by embodiments of the present invention, the cross processing unit may be connected between the analog interfaces and the multiplex interface at any location. Preferably, as shown in FIG. 10, the cross processing unit is directly connected between the clock and coding/decoding processing units and the MAC layer interface processing units. The reason for such configuration of the location of the cross processing unit is the same as that in FIG. 9.

It should be noted that, in the Ethernet physical layer multiplexing cross apparatus provided by embodiments of the present invention, since the interface connected with the next level apparatus is a multiplex interface, the large-scale cascade is easy to be implemented. In other words, it is convenient to implement cascade cross of different physical layer apparatuses. Therefore, the Ethernet physical layer multiplexing cross apparatuses with basic structure and preferable structure provided by embodiments of the present invention can not only be used to realize the local cross, but also be used to realize the cascade cross between one interface of the Ethernet physical layer multiplexing cross apparatus with an analog interface of another Ethernet physical layer multiplexing cross apparatus.

Figure 11:
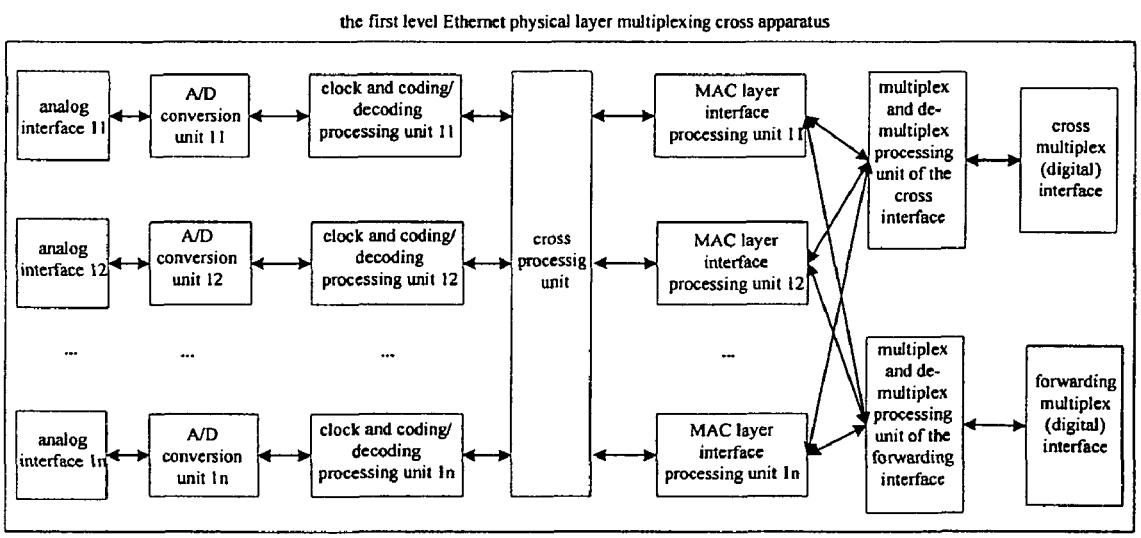
FIG. 11 is a schematic diagram illustrating structure of a first level Ethernet physical layer multiplexing cross apparatus according to an embodiment of the present invention.
Figure 12:
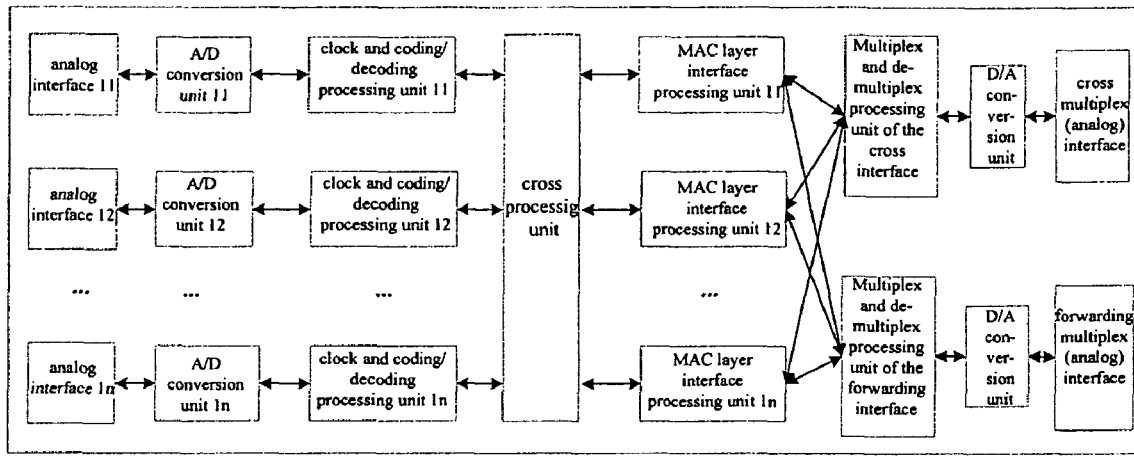
FIG. 12 is a schematic diagram illustrating another structure of the first level Ethernet physical layer multiplexing cross apparatus according to an embodiment of the present invention.
Figure 13:
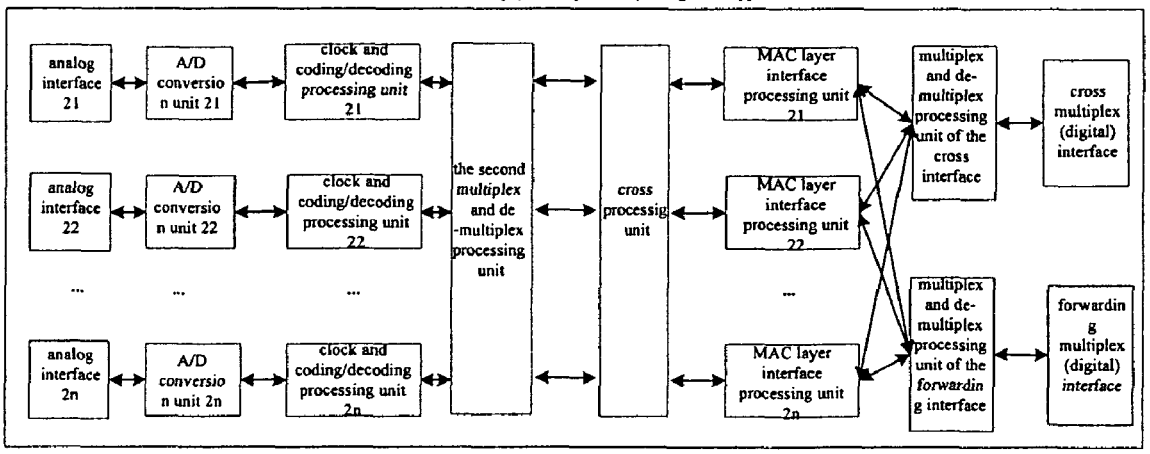
FIG. 13 is a schematic diagram illustrating structure of a next level Ethernet physical layer multiplexing cross apparatus according to an embodiment of the present invention.
Figure 14:
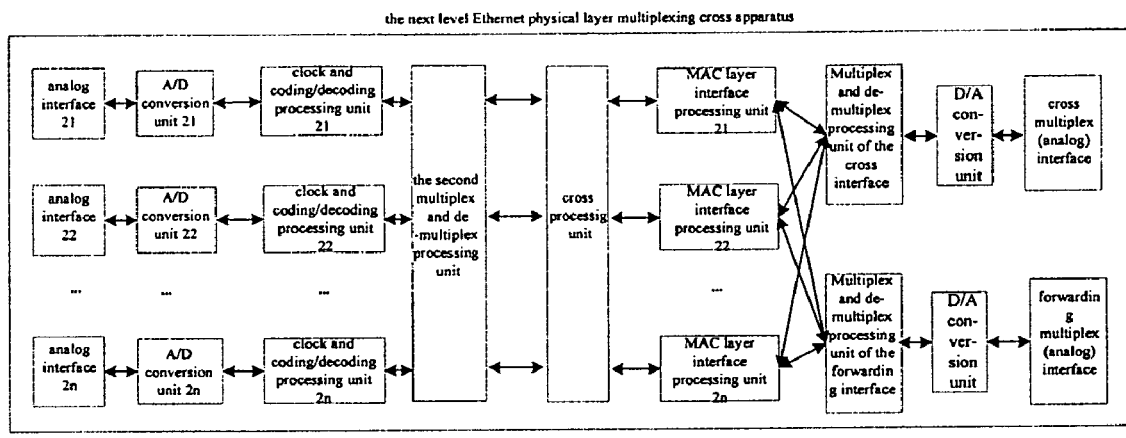
FIG. 14 is a schematic diagram illustrating another structure of the next level Ethernet physical layer multiplexing cross apparatus according to an embodiment of the present invention.

On the basis of the function of the Ethernet physical layer multiplexing cross apparatuses with the basic structure and preferable structure provided by embodiments of the present invention, embodiments of the present invention also provide an Ethernet physical layer cross cascade system. The Ethernet physical layer cross cascade system includes a plurality of cascaded Ethernet physical layer multiplexing cross apparatuses. It should be noted that, when the Ethernet physical layer multiplexing cross apparatus provided by embodiments of the present invention is used for configuring the Ethernet physical layer cross cascade system, no additional functional unit is required in the Ethernet physical layer multiplexing cross apparatus if the Ethernet physical layer multiplexing cross apparatus is taken as a first level apparatus. The multiplex interface of the first layer Ethernet physical layer multiplexing cross apparatus connects with a next level Ethernet physical layer multiplexing cross apparatus, and data sent from the first level Ethernet physical layer multiplexing cross apparatus to the next level Ethernet physical layer multiplexing cross apparatus through the multiplex interface is multiplexed data. If the Ethernet physical layer multiplexing cross apparatus of the present invention is taken as a next level apparatus in the cascade system, since data outputted by a previous level Ethernet physical multiplexing cross apparatus is multiplexed data, it is necessary to de-multiplex the data received before the cross processing so as to determine the actual interface corresponding to the data and realize correct cross. Therefore, a second multiplex and de-multiplex processing unit needs to be added between the analog interfaces and the cross processing unit. Preferably, the second multiplex and de-multiplex processing unit may be directly connected between the clock and coding/decoding processing units and the cross processing unit. Specifically, a preferable structure of the Ethernet physical layer multiplexing cross apparatus acting as the first level Ethernet physical layer multiplexing cross apparatus of the Ethernet cross cascade system is shown in FIGS. 11 and 12. A preferable structure of the Ethernet physical layer multiplexing cross apparatus acting as the next level Ethernet physical layer multiplexing cross apparatus of the Ethernet physical layer cross cascade system is shown in FIGS. 13 and 14.

In addition, in the Ethernet physical layer cross cascade system provided by embodiments of the present invention, the next level Ethernet physical layer multiplexing cross apparatus also includes a second multiplex and de-multiplex processing unit connected with the analog interfaces and the cross processing unit. The second multiplex and de-multiplex processing unit is configured to de-multiplex multiplexed data received from each analog interface before sending to the cross processing unit, send data requiring to be crossed with the previous level apparatus to a corresponding analog interface according to information of the corresponding analog interface sent from the cross processing unit. The cross processing unit is further configured to send the data requiring to be crossed with the previous level apparatus and information of an analog interface corresponding to the data to the second multiplex and de-multiplex processing unit if determining that an interface corresponding to the de-multiplexed data needs to be crossed with the previous level apparatus according to the cross relationships saved.

Refer to the Ethernet physical layer multiplexing cross apparatuses shown in FIGS. 11 to 14, the cascade cross can be implemented between physical layers. The data of each analog interface to which the local cross has not been completed in the Ethernet physical layer multiplexing cross apparatus may be sent to a next level Ethernet physical layer multiplexing cross apparatus or an Ethernet MAC layer cross apparatus for cross processing, or may be sent to another next level MAC layer apparatus for performing subsequent existing forwarding processing. In order to ensure that the data need to be crossed are crossed and the data need to be forwarded are forwarded in this case, as shown in FIGS. 11 to 14, the first multiplex and de-multiplex processing unit may include the multiplex and de-multiplex processing unit of the cross interface and the multiplex and de-multiplex processing unit of the forwarding interface. The multiplex interface may include the cross multiplex interface connected with the multiplex and de-multiplex processing unit of the cross interface and the forwarding multiplex interface connected with the multiplex and de-multiplex processing interface of the forwarding interface. In such a case, the cross processing unit sends the data outputted from the first analog interface to the multiplex and de-multiplex processing unit of the forwarding interface if determining that the first analog interface does not have a cross relationship with other analog interfaces according to the cross relationships saved, and sends the data outputted from the first analog interface to the multiplex and de-multiplex processing interface of the cross interface if determining that the first analog interface has a cross relationship with the cross multiplex interface.

In the Ethernet physical layer multiplexing cross apparatuses provided by embodiments of the present invention, as shown in FIGS. 11 to 14, if the cross processing unit is directly connected between the clock and coding/decoding processing units and the MAC layer interface processing units and used for saving cross relationships between the network device interfaces, the cross processing unit receives data outputted from each analog interface through each clock and coding/decoding processing unit, forwards the data outputted from the first analog interface to the second analog interface through sending the data to the clock and coding/decoding processing unit corresponding to the second analog interface when determining that the first analog interface has a cross relationship with the second analog interface according to the cross relationships saved. The cross processing unit further forwards the data outputted from the first analog interface to the multiplex and de-multiplex processing unit of the forwarding unit through sending the data to the MAC layer interface processing unit corresponding to the first analog interface when determining that the first analog interface does not have a cross relationship with other analog interfaces according to the cross relationships saved, and forwards the data outputted from the first analog interface to the multiplex and de-multiplex processing unit of the cross interface through sending the data and cascade cross information to the MAC layer interface processing unit corresponding to the first analog interface when determining that the first analog interface has a cross relationship with the cross interface according to the cross relationships saved.

After receiving the data and the cascade cross information, the MAC layer interface processing unit corresponding to the first analog interface sends the data to the multiplex and de-multiplex processing unit of the cross interface. If only receiving the data, the MAC layer interface processing unit corresponding to the first analog interface sends the data to the multiplex and de-multiplex processing unit of the forwarding interface.

Figure 19:
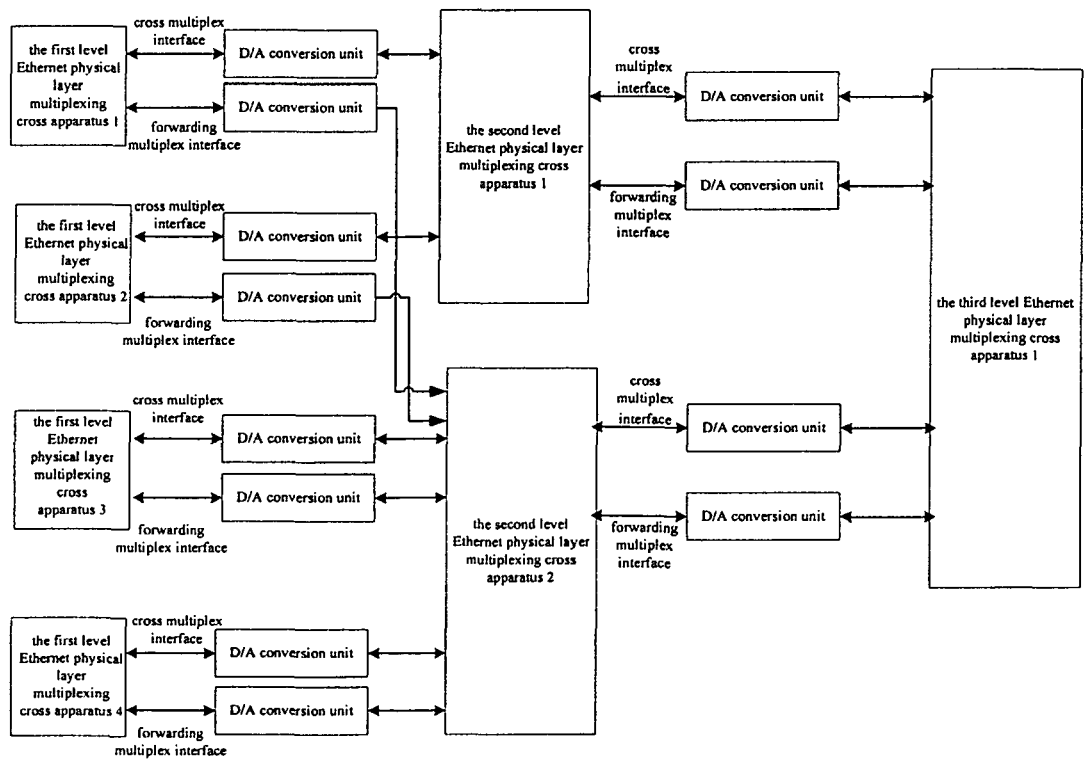
FIG. 19 is a schematic diagram illustrating structure of an Ethernet physical layer cross cascade system according to an embodiment of the present invention.

It should be noted that, each Ethernet physical layer multiplexing cross apparatus connects with the previous level Ethernet physical layer multiplexing cross apparatus through analog interfaces and connects with the next level Ethernet physical layer multiplexing cross apparatus through digital interfaces. In order to realize the cascade of different Ethernet physical layer multiplexing cross apparatuses, embodiments of the present invention provide two methods. The first mode, referring to FIGS. 11 and 13, no modification is required to the Ethernet physical layer multiplexing cross apparatuses. In other words, both the cross multiplex interface and the forwarding multiplex interface in the Ethernet physical layer multiplexing cross apparatus of the present invention are digital interfaces. When configuring the physical layer cascade system, an D/A conversion unit is connected between the analog interface of the next level Ethernet physical layer multiplexing cross apparatus and digital interface of the previous level Ethernet physical layer multiplexing cross apparatus. In such a case, the structure of the Ethernet physical layer cross cascade system is illustrated in FIG. 19. The second method: as shown in FIGS. 12 and 14, each interface of the Ethernet physical layer multiplexing cross apparatus connected with the next level Ethernet physical layer multiplexing cross apparatus is changed. In other words, both the cross multiplex interface and the forwarding multiplex interface of the Ethernet physical layer multiplexing cross apparatus are changed to analog interfaces. And a D/A conversion unit is added between each changed analog interface and the multiplex and de-multiplex processing unit. In such a case, compared with the Ethernet physical layer cross cascade system illustrated in FIG. 19, the structure of the Ethernet physical layer cross cascade system provided by embodiments of the present invention does not need the D/A conversion units connected between next level Ethernet physical layer multiplexing cross apparatus and previous level Ethernet physical layer multiplexing cross apparatus.

The working process of each Ethernet physical layer multiplexing cross apparatus applicable for cascade, i.e. each Ethernet physical layer multiplexing cross apparatus in the Ethernet physical layer cross cascade system, is introduced hereinafter.

It should be noted that, it can be deduced from the two types of fixed path relationships described above that the cross includes the local cross and cascade cross. As to the local cross, since it is performed between two analog interfaces inside the apparatus, it is only necessary to configure the cross relationship between the two analog interface.

As to the cascade cross, since the cross is implemented by cooperation of different apparatuses (such as different Ethernet physical layer multiplexing cross apparatuses and Ethernet MAC layer cross apparatuses), both the cross relationship between the analog interfaces connecting with the user terminals having the fixed path relationship and the cross relationship for ensuring the cascade intercommunication between the next level apparatus and previous level apparatus should be configured.

Therefore, as to the previous level Ethernet physical layer multiplexing cross apparatuses, as shown in FIGS. 11 and 19, if data received by the previous level Ethernet physical layer multiplexing cross apparatus 1 through one of its analog interfaces such as analog interface 11 need to be crossed with a analog interface such as analog interface 1$m$ of another previous level Ethernet physical layer multiplexing cross apparatus 2 through a next level Ethernet physical layer multiplexing cross apparatus, it is necessary to ensure that the cross processing unit of the previous level Ethernet physical layer multiplexing cross apparatus 1 can send the data received from the analog interface 11 to the next level Ethernet physical layer multiplexing cross apparatus through the cross multiplex interface. In other words, it needs to configure the cross relationship between the analog interface 11 and the cross multiplex interface of the previous level Ethernet physical layer multiplexing cross apparatus 1. As to the next level Ethernet physical layer multiplexing cross apparatus, if the data received from one of the analog interfaces of the next level Ethernet physical layer multiplexing cross apparatus needs to be sent to the previous level Ethernet physical layer multiplexing cross apparatus 2 for previous level cascade cross, it is also necessary to configure corresponding information of the analog interface used for outputting the data from the next level Ethernet physical layer multiplexing cross apparatus.

According to the analysis to the previous level Ethernet physical layer multiplexing cross apparatus and the next level Ethernet physical layer multiplexing cross apparatus, the processing of the Ethernet physical layer multiplexing cross apparatus for cascade can be obtained as follows:

In the previous level Ethernet physical layer multiplexing cross apparatus, the cross processing unit is configured to send data and cascade cross information to the MAC layer interface processing unit corresponding to the first analog interface if determining that there is a cross relationship between the first analog interface and the cross multiplex interface according to the cross relationships saved, i.e. the next level cascade cross is required when receiving the data outputted from the first analog interface. If receiving the data and the cascade cross information, the MAC layer interface processing unit corresponding to the first analog interface sends the data to the multiplex and de-multiplex processing unit of the cross interface. If only receiving the data, the MAC layer interface processing unit corresponding to the first analog interface sends the data to the multiplex and de-multiplex processing unit of the forwarding interface.

In the next level Ethernet physical layer multiplexing cross apparatus, the cross processing unit sends the data requiring to be crossed with the previous level apparatus and the information of the analog interface corresponding to the data to the second multiplex and de-multiplex processing unit when determining an analog interface corresponding to the de-multiplexed data requiring to be crossed with the previous level apparatus according to the cross relationships saved. The second multiplex and de-multiplex processing unit is configured to de-multiplex the multiplexed data sent from the clock and coding/decoding processing unit before sending to the cross processing unit, determine a clock and coding/decoding processing unit corresponding to the analog interface, and send the data requiring to be crossed with the previous level apparatus to the clock and coding decoding, processing unit determined after receiving the data requiring to be crossed with the previous level apparatus and the information of the analog interface corresponding to the data from the cross processing unit.

For example, as shown in FIGS. 11, 13 and 19, it is supposed that the user terminal connected with the analog interface 11 of the first level Ethernet physical layer multiplexing cross apparatus 1 has a Fixed path relationship with the user terminal connected with the analog interface 1m of the first level Ethernet physical layer multiplexing cross apparatus 2, i.e. there is a cross relationship between the analog interface 11 and the analog interface 1m. Thus, in the first level Ethernet physical layer multiplexing cross apparatus 1, when receiving data from the analog interface 11, the cross processing unit determines that the analog interface 11 has the cross relationship with the cross multiplex interface of the Ethernet physical layer multiplexing cross apparatus according to the pre-saved cross relationships between the network device interfaces. Therefore, the cross processing unit sends the data to analog interface 21 of a next level Ethernet physical layer multiplexing cross apparatus shown in FIG. 13 through the MAC layer interface processing unit 11, the multiplex and de-multiplex processing unit of the cross interface, the D/A conversion unit and the cross multiplex interface. In the next level Ethernet physical layer multiplexing cross apparatus, the analog interface 21 receives the data sent from the previous level Ethernet physical layer multiplexing cross apparatus 1. After being processed by A/D conversion unit 21, clock and coding/decoding processing unit 21 and the second multiplex and de-multiplex processing unit, the multiplexed data are sent to the cross processing unit. The cross processing unit analyzes the multiplexed data and determines that the data is sent from the analog interface 11 of the previous level Ethernet physical layer multiplexing cross apparatus 1. According to the pre-saved cross relationships between the network device interfaces saved in advance, it is determined that analog interface 11 has a cross relationship with analog interface 1m of another previous level Ethernet physical layer multiplexing cross apparatus 2. And analog interface 2n in the second level cross apparatus is connected to the first level Ethernet physical layer multiplexing cross apparatus 2. Therefore, the cross processing unit sends the data received and the information of the analog interface 2n corresponding to the data to the second multiplex and de-multiplex processing unit. The second multiplex and de-multiplex processing unit sends the data to the cross multiplex interface of the previous level Ethernet physical layer multiplexing cross apparatus 2 through clock and coding/decoding processing unit 2n, A/D conversion unit 2n and the analog interface 2n according to the information of the analog interface 2n. Finally, the data is sent to the cross processing unit of the previous level Ethernet physical layer multiplexing cross apparatus 2. The cross processing unit of the previous level Ethernet physical layer multiplexing cross apparatus 2 sends the data to the analog interface 1m of the previous level Ethernet physical layer multiplexing cross apparatus 2 according to the pre-saved cross relationships. Therefore, the cross of the data between the analog interface 11 of the previous level Ethernet physical layer multiplexing cross apparatus 1 and the analog interface 1m of Ethernet physical layer multiplexing cross apparatus 2 is implemented.

In addition, the Ethernet physical layer cross cascade system provided by embodiments of the present invention may further include a self-negotiation unit. The self-negotiation unit is connected with each analog interface and the multiplex and de-multiplex processing unit of the previous level Ethernet physical layer multiplexing cross apparatus, and connected with the multiplex and de-multiplex processing unit and a media access control port (i.e. an interface connected with the next level apparatus) of the next level Ethernet physical layer multiplexing cross apparatus. The self-negotiation unit is further configured to obtain at least one of transmission rate and multiplex manner respectively supported by each analog interface and the multiplex and de-multiplex processing unit of the previous level Ethernet physical layer multiplexing cross apparatus and the multiplex and de-multiplex processing unit and the media access control port of the next level Ethernet physical layer multiplexing cross apparatus, determine at least one of the transmission rate and multiplex manner used by each interface and send the determined at least one of the transmission rate and multiplex manner to each analog interface and the multiplex and de-multiplex processing unit of the previous level Ethernet physical layer multiplexing cross apparatus and to the multiplex and de-multiplex processing unit and the media access control port of the next level Ethernet physical layer multiplexing cross apparatus respectively. Thus, when being connected in cascade, the transmission rate of the interface in the previous level Ethernet physical layer multiplexing cross apparatus accords with that in the next level Ethernet physical layer multiplexing cross apparatus. Moreover, the next level and previous level adopt the same multiplex manner, which ensures that the next level apparatus and the previous level apparatus can recognize the data sent by each other.

In the Ethernet physical layer cross cascade system, a multiplex and de-multiplex processing unit is respectively employed in the next level and the previous level apparatuses, which ensures the realization of the cascade. In embodiments of the present invention, the multiplex and de-multiplex processing unit connected with the cross multiplex interface in the previous level Ethernet physical layer multiplexing cross apparatus and the multiplex and de-multiplex processing unit connected with the media access control interface (i.e. the interface connected with the next level apparatus) of the next level Ethernet physical layer multiplexing cross apparatus can be logically combined as a multiplex transmission apparatus. In addition, the self-negotiation unit in the Ethernet physical layer cross cascade system may be a part of the multiplex transmission apparatus.

Figure 3:
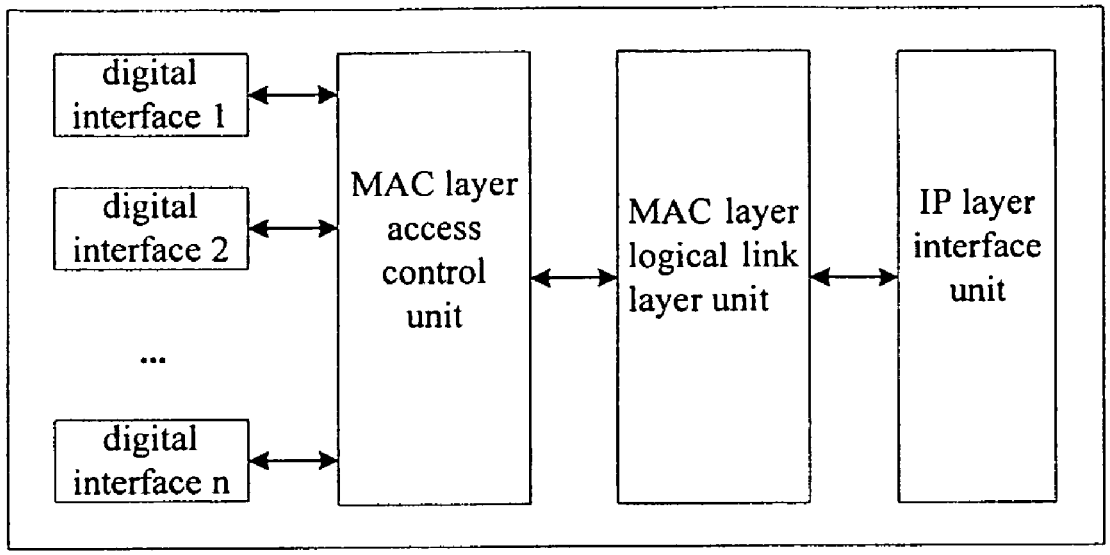
FIG. 3 is a schematic diagram illustrating structure of a conventional Ethernet MAC layer apparatus.
Figure 15:
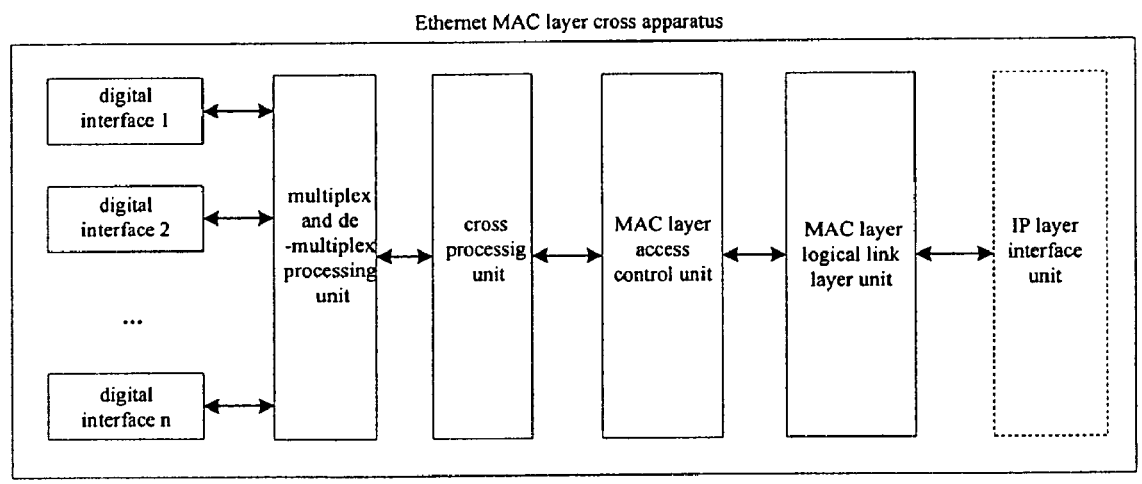
FIG. 15 is a schematic diagram illustrating structure of an Ethernet MAC layer cross apparatus according to an embodiment of the present invention.

In addition, embodiments of the present invention provide an Ethernet MAC layer cross apparatus. As shown in FIG. 15, the Ethernet MAC layer cross apparatus is obtained by improving the existing MAC layer apparatus shown in FIG. 3. Compared with the existing MAC layer apparatus shown in FIG. 3, the Ethernet MAC layer cross apparatus shown in FIG. 15 not only includes the existing plurality of digital interfaces, the MAC layer access control unit and MAC layer logical link layer units connected with the plurality of digital interfaces, but also includes a multiplex and de-multiplex processing unit and a cross processing unit.

The processing performed by each existing interfaces and units is similar with that of the conventional method.

The multiplex and de-multiplex processing unit is configured to de-multiplex data outputted from each digital interface and send de-multiplexed data to the cross processing unit, and send data requiring to be crossed with the previous level apparatus to corresponding digital interface after receiving the data requiring to be crossed with the previous level apparatus and information of the digital interface corresponding to the data sent from the cross processing unit.

The cross processing unit is configured to save cross relationships between network device interfaces, send the data requiring to be crossed with the previous level apparatus and the information of the digital interface corresponding to the data to the multiplex and de-multiplex processing unit when determining that the interface corresponding to the de-multiplexed data requiring to be crossed with the previous level apparatus according to the cross relationships saved, and send the data to the MAC layer access control unit after determining that the interface corresponding to the de-multiplexed data does not have a cross relationship with other interfaces.

Figure 16:
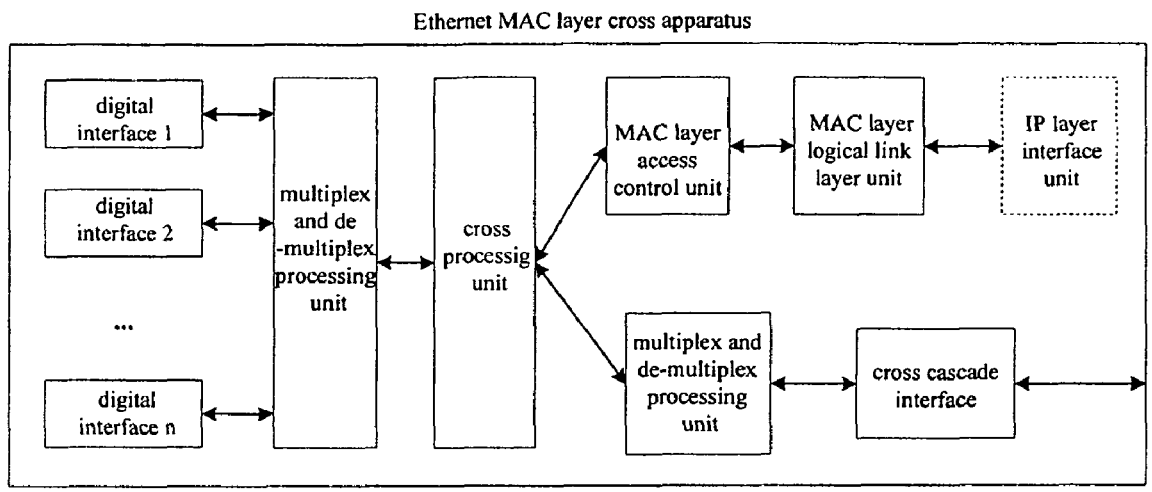
FIG. 16 is a schematic diagram illustrating structure of an Ethernet MAC layer cross apparatus for cascade according to an embodiment of the present invention.

The Ethernet MAC layer cross apparatus shown in FIG. 15 can also be used for implementing cross cascade. Referring to FIG. 16, the Ethernet MAC layer cross to apparatus further includes a cross cascade interface connected with a next level apparatus, and includes a multiplex and de-multiplex processing unit connected between the cross cascade interface and the cross processing unit.

The cross processing unit is configured to send the data to the multiplex and de-multiplex processing unit which is directly connected with the cross cascade interface if determining that the interface corresponding to the de-multiplexed data need not to be crossed with the previous level apparatus but has a cross relationship with the cross cascade interface according to the cross relationships saved.

The multiplex and de-multiplex processing unit connected between the cross cascade interface and the cross processing interface is configured to multiplex the data received and send the multiplexed data to the cross cascade interface. The cross cascade interface sends the multiplexed data to a next level Ethernet MAC layer cross apparatus or a next level IP layer apparatus.

Figure 20:
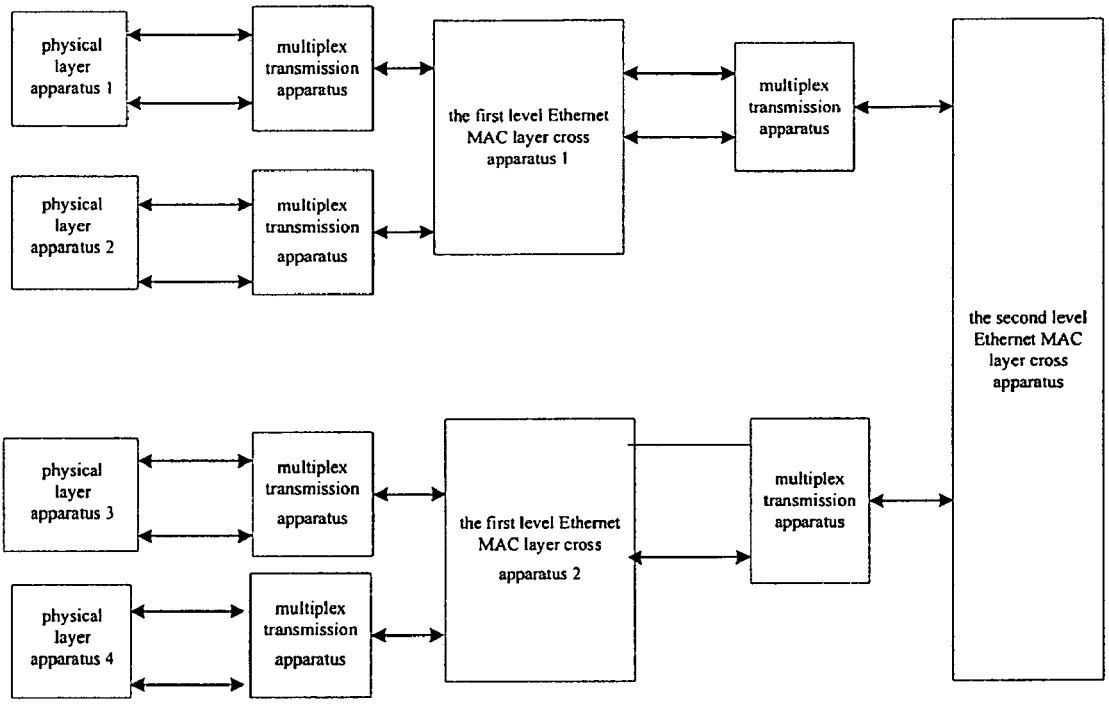
FIG. 20 is a schematic diagram illustrating structure of an Ethernet MAC layer cross cascade system according to an embodiment of the present invention.

Accordingly, on the basis of the Ethernet MAC layer cross apparatus shown in FIG. 16, embodiments of the present invention also provide an Ethernet MAC layer cross cascade system. As shown in FIG. 20, the system includes a plurality cascaded Ethernet MAC layer cross apparatuses. The Ethernet MAC layer cross apparatuses are connected with each other through logical functional units, i.e. multiplex transmission apparatuses. When the Ethernet MAC layer cross cascade system shown in FIG. 20 is configured using the Ethernet MAC layer cross apparatus shown in FIG. 16, the system may further include a self-negotiation unit. The self-negotiation unit is configured to obtain at least one of transmission rate and multiplex manner respectively supported by each analog interface and the multiplex and de-multiplex processing unit of the previous level Ethernet MAC layer multiplexing cross apparatus and the multiplex and de-multiplex processing unit and the media access control port (i.e. the interface connected with the next level apparatus) of the next level Ethernet MAC layer multiplexing cross apparatus, determine at least one of the transmission rate and multiplex manner used by each interface and send the determined at least one of the transmission rate and multiplex manner to each digital interface and the multiplex and de-multiplex processing unit of the previous level MAC layer multiplexing cross apparatus and to the multiplex and de-multiplex processing unit and the media access control port of the next level Ethernet MAC layer multiplexing cross apparatus respectively. Thus, when being connected in cascade, the transmission rate of the interface of the previous level Ethernet MAC layer multiplexing cross apparatus accords with that of the next level Ethernet MAC layer multiplexing cross apparatus. Moreover, the next level and previous level apparatuses adopt the same multiplex manner, which ensures that the next level and the previous level apparatuses can recognize the data sent from each other.

It should be noted that, in the MAC layer cascade system shown in FIG. 20, the first level Ethernet MAC layer cross apparatus may also be cascaded with a plurality of previous level Ethernet physical layer multiplexing cross apparatuses through digital interfaces.

Figure 4:
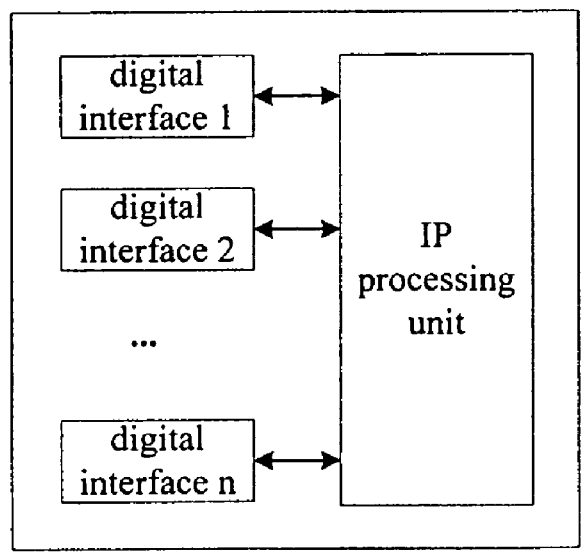
FIG. 4 is a schematic diagram illustrating structure of a conventional Ethernet IP layer apparatus.
Figure 5:
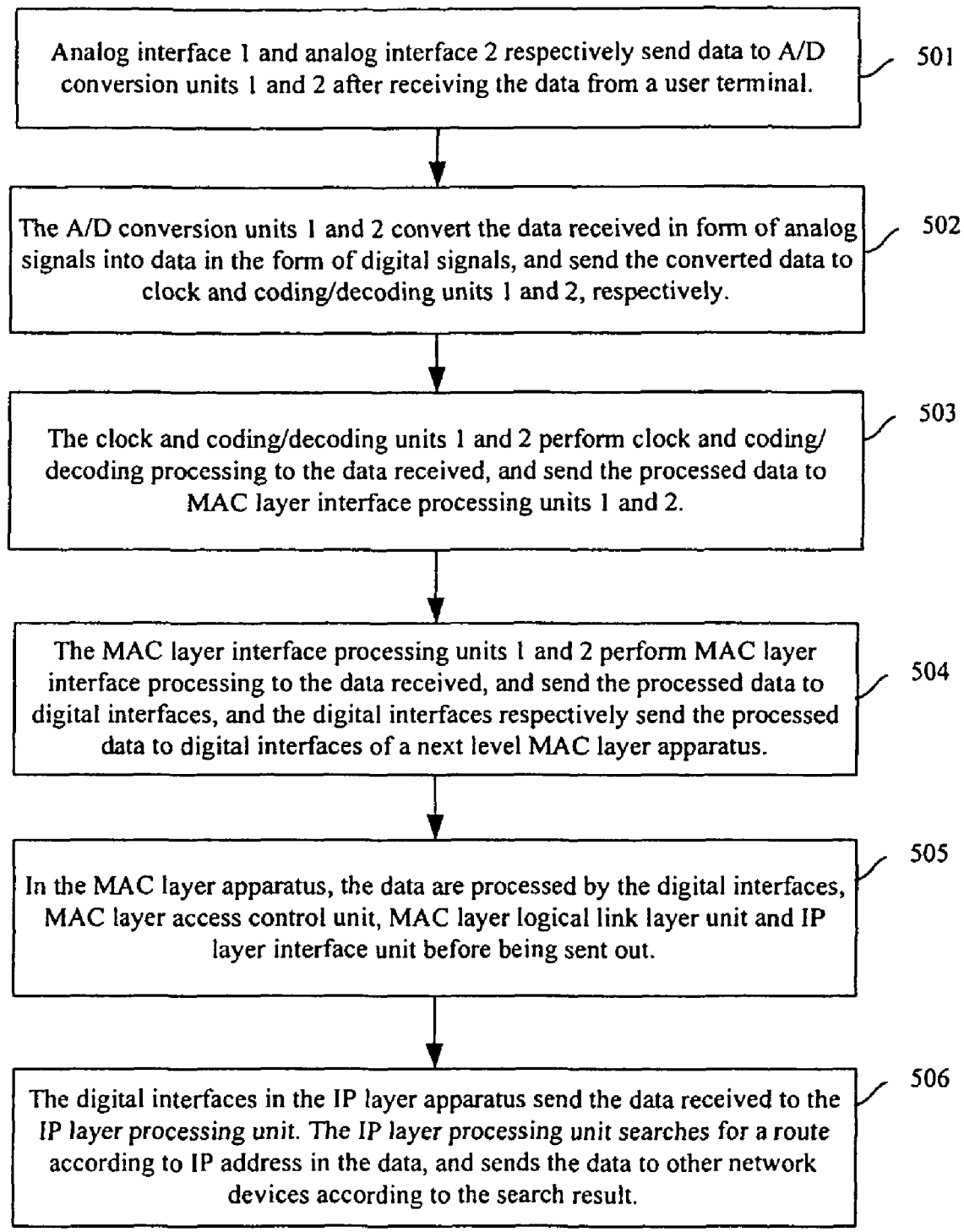
FIG. 5 is a simplified flowchart illustrating a process of data forwarding.
Figure 17:
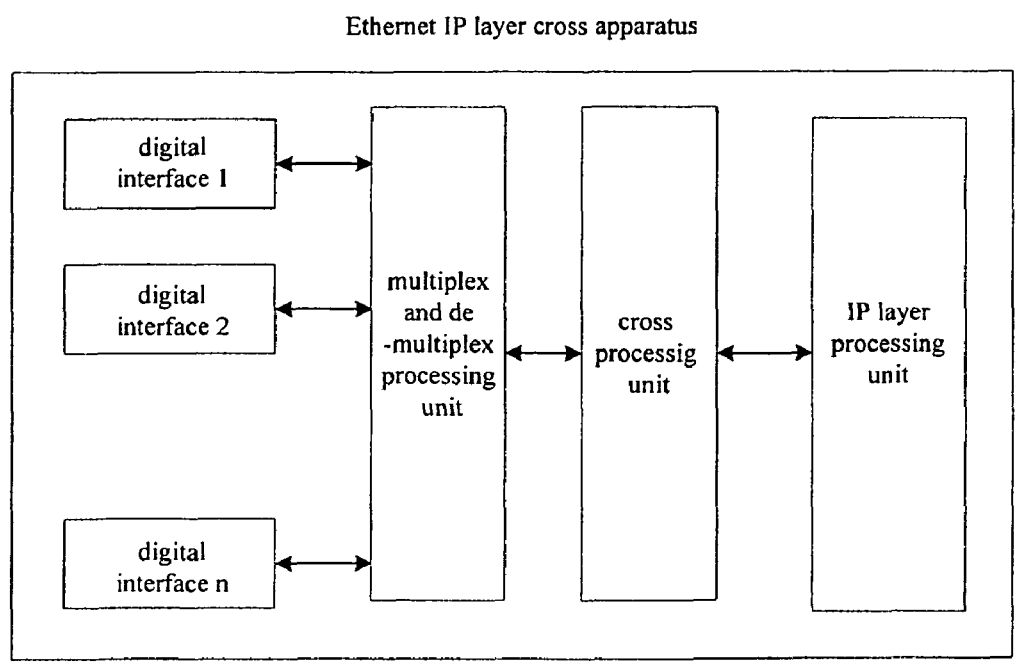
FIG. 17 is a schematic diagram illustrating structure of an IP layer cross apparatus according to an embodiment of the present invention.

Embodiments of the present invention also provide an IP layer cross apparatus. As shown in FIG. 17, the Ethernet IP layer cross apparatus is obtained by improving the existing IP layer apparatus shown in FIG. 4. Compared with the existing IP layer apparatus shown in FIG. 4, the Ethernet IP layer cross apparatus shown in FIG. 17 not only includes the existing plurality of digital interfaces and the IP layer processing unit connected with the digital interfaces, but also includes a multiplex and de-multiplex processing unit and a cross processing unit.

The multiplex and de-multiplex processing unit is configured to de-multiplex data outputted from each digital interface and send de-multiplexed data to the cross processing unit, and send data requiring to be crossed with the previous level apparatus to a digital interface corresponding to the data after receiving the data requiring to be crossed with the previous level apparatus and information of the digital interface corresponding to the data sent from the cross processing unit.

The cross processing unit is configured to save cross relationships between network device interfaces, send the data requiring to be crossed with the previous level apparatus and information of the digital interface corresponding to the data to the multiplex and de-multiplex processing unit when determining that the interface corresponding to the de-multiplexed data is required to be crossed with the next level apparatus according to the cross relationships saved, and send the data to the IP layer processing unit if determining that the interface corresponding to the de-multiplexed data does not have a cross relationship with other interfaces according to the cross relationships saved.

Figure 18:
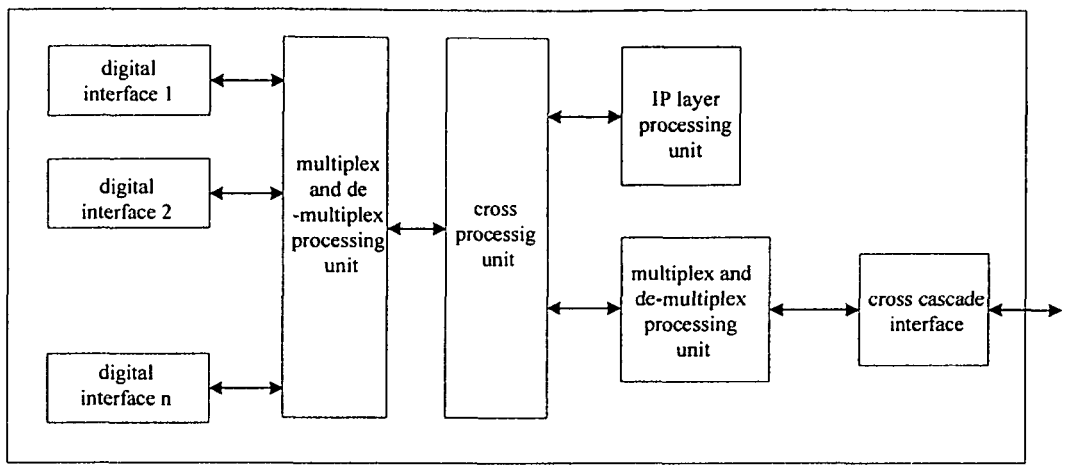
FIG. 18 is a schematic diagram illustrating structure of an DP layer cross apparatus for cascade according to an embodiment of the present invention.

The Ethernet IP layer cross apparatus shown in FIG. 17 may also be used for implementing cross cascade. Referring to FIG. 18, the Ethernet IP layer cross apparatus further includes a cross cascade interface connected with a next level apparatus, and a multiplex and de-multiplex processing unit connected between the cross cascade interface and the cross processing unit.

The cross processing unit is configured to send the data to the multiplex and de-multiplex processing unit which is directly connected with the cross cascade interface if determining that the interface corresponding to the de-multiplexed data is required to be crossed with the previous level apparatus but has a cross relationship with the cross cascade interface according to the cross relationships saved.

The multiplex and de-multiplex processing unit connected between the cross cascade interface and the cross processing unit is configured to multiplex the data received and send the multiplexed data to the cross cascade interface.

Figure 21:
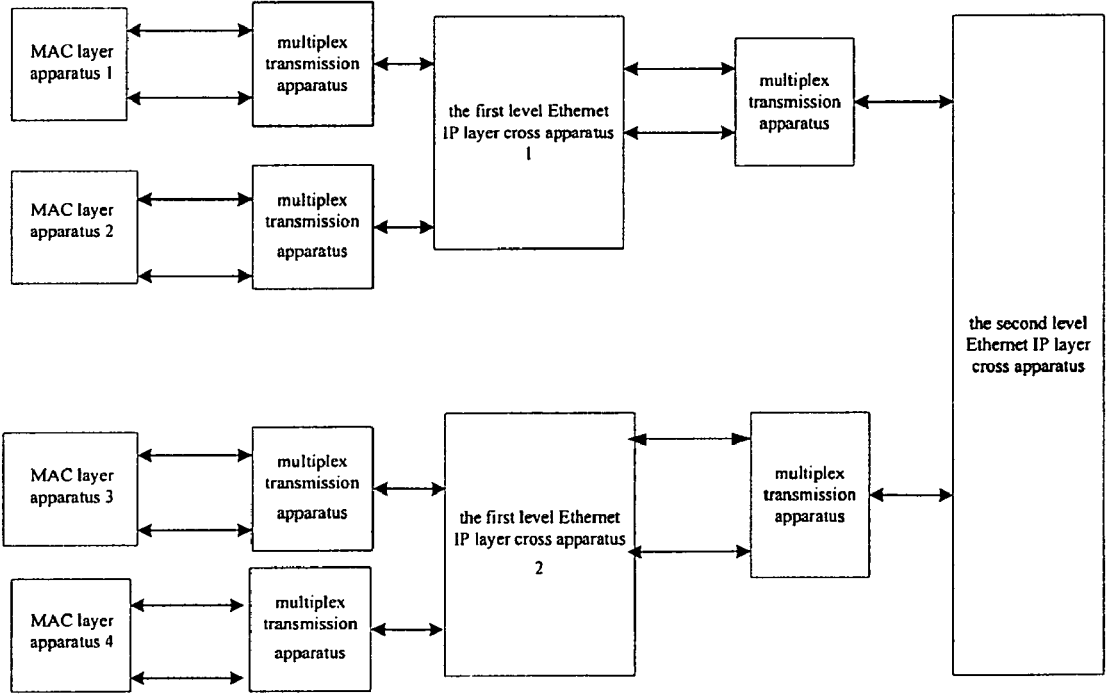
FIG. 21 is a schematic diagram illustrating structure of an Ethernet IP layer cross cascade system according to an embodiment of the present invention.

Accordingly, on the basis of the Ethernet IP layer cross apparatus shown in FIG. 18, embodiments of the present invention also provide an Ethernet IP layer cross cascade system. As shown in FIG. 21, the system includes a plurality of cascaded Ethernet IP layer cross apparatuses connected with each other through logical functional units, i.e. multiplex transmission apparatuses. In addition, when the Ethernet IP layer cross cascade system shown in FIG. 21 is configured with the Ethernet IP layer cross apparatuses shown in FIG. 18, the system may further includes a self-negotiation unit. The self-negotiation unit is configured to obtain at least one of transmission rate and multiplex manner respectively supported by each digital interface and the multiplex and de-multiplex processing unit of the previous level Ethernet IP layer cross apparatus and the multiplex and de-multiplex processing unit and the media access control port (i.e. the interface connected with the next level apparatus) of the next level Ethernet IP layer cross apparatus, determine at least one of the transmission rate and multiplex manner used by each interface, and send the determined at least one of the transmission rate and multiplex manner to each digital interface and the multiplex and de-multiplex processing unit of the previous level Ethernet IP layer cross apparatus and the multiplex and de-multiplex processing unit and the media access control port of the next level Ethernet IP layer cross apparatus respectively.

In the IP layer cascade system shown in FIG. 21, the first level Ethernet IP layer cross apparatus may be cascaded with a plurality of MAC layer cross apparatuses through digital interfaces.

Figure 22:
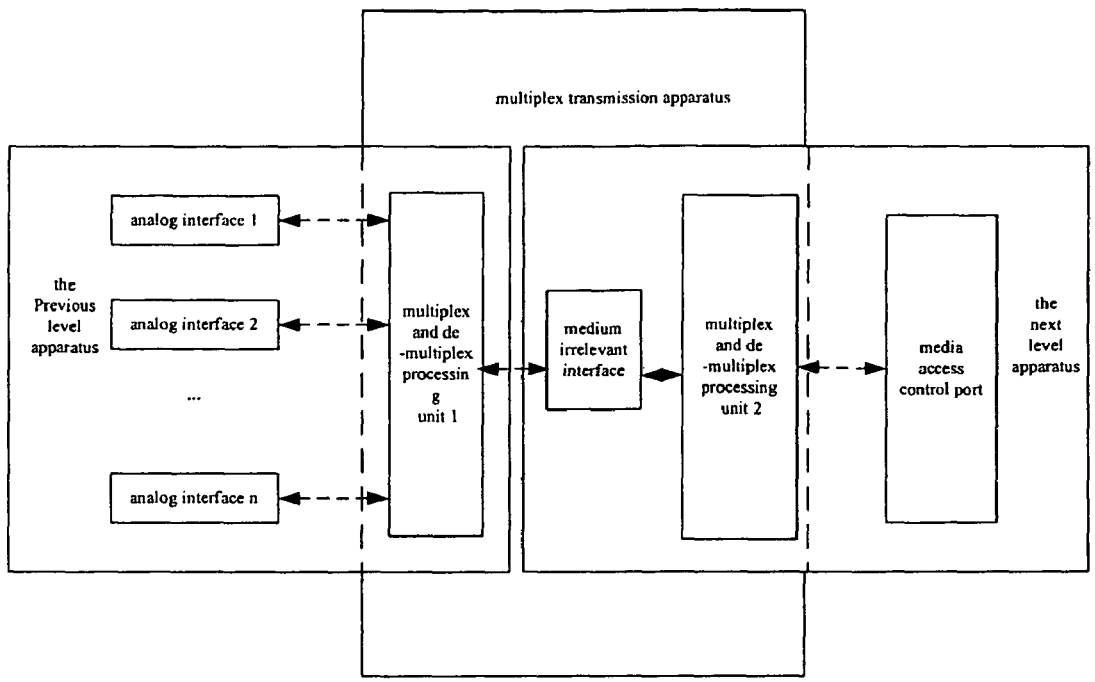
FIG. 22 is a schematic diagram illustrating basic structure of a multiplex transmission apparatus according to an embodiment of the present invention.
Figure 23:
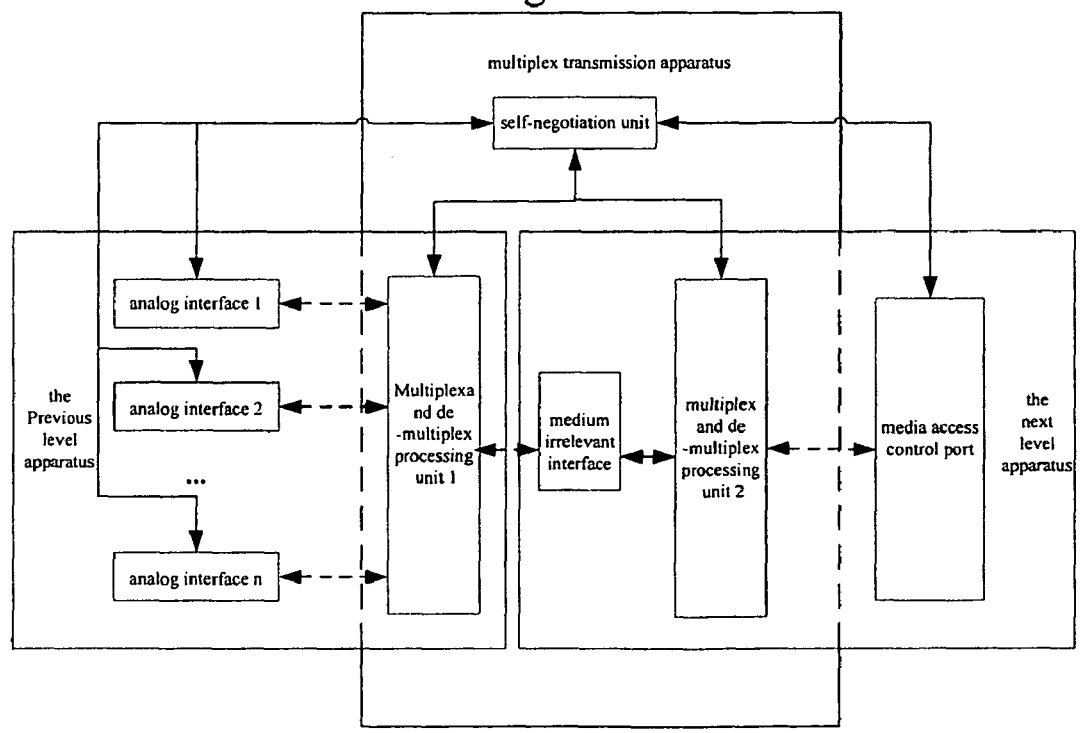
FIG. 23 is a schematic diagram illustrating preferred structure of the multiplex transmission apparatus according to an embodiment of the present invention.

It should be noted that, in each cascade system provided by embodiments of the present invention, since the next level apparatus can be connected with a plurality of previous level apparatuses, the rate of interfaces of the next level apparatus is required to be set higher than that of the previous level apparatus. Thus, the data needs to be multiplexed in the previous level apparatus and de-multiplexed in the next level apparatus. As such, in each cascade system, the internal structure of the logical functional unit, i.e. the multiplex transmission apparatus connecting the next level apparatus and the previous level apparatus is shown in FIG. 22. The multiplex transmission apparatus includes multiplex and de-multiplex processing unit 1 of the previous level apparatus, and a medium irrelevant interface (i.e. a digital interface connected with the previous level apparatus) and multiplex and de-multiplex processing unit 2 of the next level apparatus. Preferably, in order to ensure that the transmission rate of the interface in the previous level apparatus can accord with that of the next level apparatus, and ensure that the next level apparatus and the previous level apparatus use the same multiplex manner, as shown in FIG. 23, the multiplex transmission unit may further include the self-negotiation unit which has been described in the foregoing cascade system.

Figure 24:
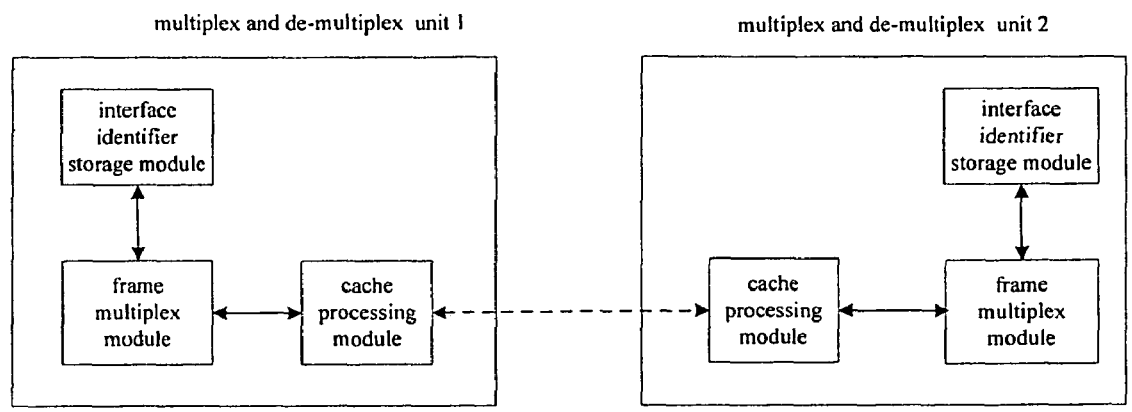
FIG. 24 is a schematic diagram illustrating stricture of two cascaded multiplex and de-multiplex processing units according to an embodiment of the present invention.
Figure 25:
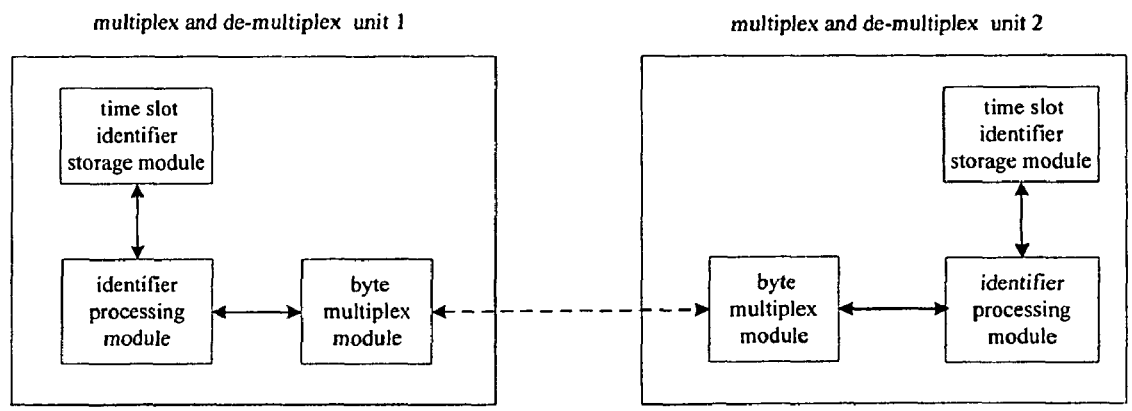
FIG. 25 is a schematic diagram illustrating another structure of two cascaded multiplex and de-multiplex processing units according to an embodiment of the present invention.

As shown in FIGS. 24 and 25, the multiplex and de-multiplex processing unit 1 and multiplex and de-multiplex processing unit 2 of the multiplex transmission apparatus are respectively located in the previous level apparatus and next level apparatus of the concatenated system of the present invention, e.g. the previous level and next level Ethernet physical layer multiplexing cross processing apparatus, the previous level and next level Ethernet MAC layer cross apparatuses and the previous level and next level Ethernet IP layer cross apparatuses. The internal structure of the multiplex and de-multiplex processing unit 1 and multiplex and dc-multiplex processing unit 2 can be characterized into two types.

The first structure: an interface identifier storage module, a frame multiplex module and a cache processing module are included for implementing the multiplex and de-multiplex processing between the next level apparatus and the previous level apparatus.

When implementing the transmission of the data between the next level apparatus and the previous level apparatus, the interface identifier storage module is configured to store identifiers corresponding to the analog interfaces in each Ethernet physical layer multiplexing cross apparatus.

The frame multiplex module is configured to search for a first identifier corresponding to a first analog interface in the interface identifier storage module after receiving a first data corresponding to the first analog interface, carry the first identifier in the first data and send the first data to the cache processing module. The frame multiplex module is further configured to receive a second data carrying a second identifier from the cache processing module, and send the second data to a second analog interface corresponding to the second identifier according to the second identifier carried in the second data and content stored in the interface identifier storage module.

The cache processing module is configured to cache the first data sent from the frame multiplex module, convert transmission rate of the first data from the frame multiplex module according to transmission rate of a multiplex interface connected with the cache processing module, and send the first data to the multiplex interface. The cache processing module is further configured to cache the second data carrying the second identifier sent from the multiplex interface, convert transmission rate of the second data according to transmission rate of the second analog interface and send the second data to the frame multiplex module.

The second structure: a time slot identifier storage module, an identifier processing module and a byte multiplex module are included.

When implementing the transmission of the data between the next level apparatus and the previous level apparatus, the time slot identifier storage module is configured to store identifiers and time slots corresponding to each analog interface in each Ethernet physical layer multiplexing cross apparatus.

The identifier processing module is configured to read a first data with a fixed length corresponding to a first analog interface at a time slot of the first analog interface according to content of stored in the time slot identifier storage module, carry a first identifier corresponding to the first analog interface in the first data and send the first data to the byte multiplex apparatus. The identifier processing module is further configured to send a second data carrying a second identifier to a second analog interface corresponding to the second identifier according to second the identifier carried in the second data after receiving the second data carrying the second identifier from the byte multiplex module.

The byte multiplex module is configured to convert transmission rate of the first data sent from the identifier processing module according to the transmission rate of a multiplex interface and send the first data to the multiplex interface. The byte multiplex module is further configured to convert transmission rate of the second data carrying the second identifier sent from the multiplex interface according to transmission rate of the second analog interface and send the second data to the identifier processing module.

It should be noted that, in embodiments of the present invention, since the multiplex and de-multiplex techniques are employed, each interface must has a unique identifier. As to the selection of the identifier, a global coding scheme may be adopted for all interfaces, i.e. the interfaces of all the Ethernet physical layer multiplexing cross apparatuses are identified by uniform coding. It is also possible to adopt a local coding scheme for local apparatus, i.e. the interfaces of each Ethernet physical layer multiplexing cross apparatus are identified through coding scheme. For the globally coded interface identifiers, uniform time slot codes, or private Tag identifiers or interface Virtual Local Area Network (VLAN) identifiers are adopted globally.

In addition, it should be noted that, the fixed path relationship between user terminals is very possible to be changed. For example, a new fixed path relationship may be generated between the user terminals. Preferably, in order to ensure the correct of the cross processing, a cross configuration unit is further included in each apparatus, such as the Ethernet physical layer standard cross apparatus, Ethernet physical layer multiplexing cross apparatus, Ethernet IP layer cross apparatus and Ethernet MAC layer cross apparatus. The cross configuration unit is configured to send cross relationship information inputted by a manager to the cross processing unit. The cross processing unit is further configured to update the cross relationships stored in the cross processing unit according to the cross relationship information sent from the cross configuration unit.

In embodiments of the present invention, the cross processing unit may be implemented by any kind of functional unit capable of controlling data flow direction, such as a controllable electric switch, switch matrix or cross matrix, etc.

In the above embodiments, according to the technical solution of the present invention, the cross in each layer and each level may be designed on the basis of a basic solution. However, the cross in different layers or different levels may be extended differently. The basic solution at least includes a first and a second Ethernet-based interfaces to be crossed, and a cross processing unit. The cross processing unit performs data exchange between the first and the second cross interfaces according to the pre-configured cross relationship. Further, the Ethernet device includes a forwarding interface on the basis of addressing forwarding scheme and a third interface on the basis of the Ethernet technologies. The cross processing unit performs data exchange between the forwarding interface and the third interface.

In the above embodiments, according to the technique solution of the present invention, the cross in each layer and each level may also be designed on the basis of another basis solution. However, the cross in different layers or different levels may be extended differently. The basic solution at least includes a first, a second and a third Ethernet interfaces, an addressing forwarding interface and a cross processing unit. The cross processing unit is used for connect the first and second tunnel according to the pre-configured cross relationship, and connects the third tunnel and the addressing forwarding interface. The first, second and third Ethernet interfaces locate at the same communication layer, whereas the forwarding interface is connected with a higher communication layer.

The foregoing are only the preferred embodiments of the present invention and are not for use in limiting the invention. Any modification, equivalent replacement or improvement made under the principles of this invention is included in the protection scope of the present invention.

The invention claimed is:

1. An Ethernet physical layer cross apparatus, comprising:
a plurality of analog interfaces, a plurality of digital interfaces respectively corresponding to each of the analog interfaces; and
a cross processing unit; wherein the cross processing unit is configured to
save cross relationships between network device interfaces;
send data outputted from a first analog interface to a second analog interface if determining that the first analog interface has a cross relationship with the second analog interface according to the cross relationships saved after receiving the data from the first analog interface; and
send the data outputted from the first analog interface to a digital interface corresponding to the first analog interface if determining that the first analog interface does not have a cross relationship with other analog interfaces according to the cross relationships saved.

2. The Ethernet physical layer cross apparatus of claim 1, further comprising: a plurality of clock and coding/decoding processing units and a plurality of Media Access Control, MAC, layer interface processing units respectively corresponding to each of the analog interfaces and connected between the analog interfaces and the digital interfaces; wherein
the cross processing unit is connected between the clock and coding/decoding processing units and the MAC layer interface processing units.

3. An Ethernet physical layer cross apparatus, comprising:
a plurality of analog interfaces and a first multiplex and de-multiplex processing unit; and
a cross processing unit, and a multiplex interface connected with the first multiplex and de-multiplex processing unit and an outside apparatus; wherein the cross processing unit is configured to
save cross relationships between network device interfaces;
send data output from a first analog interface to a second analog interface if determining that the first analog interface has a cross relationship with the second analog interface according to the cross relationships saved when receiving the data outputted from the first analog interface; and
send the data outputted from the first analog interface to the first multiplex and de-multiplex processing unit if determining that the first analog interface does not have a cross relationship with other analog interfaces according to the cross relationships saved.

4. The Ethernet physical layer cross apparatus of claim 3, wherein the first multiplex and de-multiplex processing unit comprises a multiplex and de-multiplex processing unit of a cross interface and a multiplex and de-multiplex processing unit of a forwarding interface; and the multiplex interface comprises a cross multiplex interface connected with the multiplex and de-multiplex processing unit of the cross interface and a forwarding multiplex interface connected with the multiplex and de-multiplex processing unit of the forwarding interface; wherein the cross processing unit is further configured to send the data outputted from the first analog interface to the multiplex and de-multiplex processing unit of the forwarding interface if determining that the first analog interface does not have a cross relationship with other analog interfaces according to the cross relationships saved; and send the data outputted from the first analog interface to the multiplex and de-multiplex processing unit of the cross interface if determining that the first analog interface has a cross relationship with the cross multiplex interface according to the cross relationships saved.

5. The Ethernet physical layer cross apparatus of claim 4, further comprising: a plurality of clock and coding/decoding processing units and a plurality of MAC layer interface processing units respectively corresponding to the analog interfaces and connected between the analog interfaces and the first multiplex and de-multiplex processing unit; wherein the cross processing unit is directly connected between the clock and coding/decoding processing units and the MAC layer interface processing units; wherein a MAC layer interface processing unit corresponding to the first analog interface is further configured to send the data to the multiplex and de-multiplex processing unit of the cross interface if receiving the data and cascade cross information sent from the cross processing unit; and send the data to the multiplex and de-multiplex processing unit of the forwarding interface if receiving the data from the cross processing unit.

6. The Ethernet physical layer cross apparatus of claim 3, further comprising:

a second multiplex and de-multiplex processing unit, coupled with the plurality of analog interfaces and the cross processing unit, configured to de-multiplex multiplexed data received from each analog interface, send de-multiplexed data to the cross processing unit, and send data requiring to be crossed with a previous level apparatus from the cross processing unit to a corresponding analog interface; wherein the cross processing unit is further configured to send the data requiring to be crossed with the previous level apparatus and information of the analog interface corresponding to the data requiring to be crossed with the previous level apparatus to the second multiplex and de-multiplex processing unit if determining that the interface corresponding to the de-multiplexed data requires to be crossed with the previous level apparatus according to the cross relationships saved.

7. The Ethernet physical layer cross apparatus of claim 6, further comprising: a plurality of clock and coding/decoding processing units, respectively corresponding to the analog interfaces and connected between the analog interfaces and the cross processing unit; wherein the second multiplex and de-multiplex processing unit is directly connected between the clock and coding/decoding processing units and the cross processing unit.

8. An Ethernet Media Access Control, MAC, layer cross apparatus, comprising:

a plurality of digital interfaces and a MAC layer access control unit; and a first multiplex and de-multiplex processing unit and a cross processing unit; wherein the first multiplex and de-multiplex processing unit is configured to de-multiplex data outputted from the digital interfaces, send the de-multiplexed data to the cross processing unit, and send data requiring to be crossed with a previous level apparatus received from the cross processing unit to a corresponding digital interface; and the cross processing unit is configured to save cross relationships between network device interfaces, send the data requiring to be crossed with the previous level apparatus and information of an interface corresponding to the data requiring to be crossed with the previous level apparatus to the first multiplex and de-multiplex processing unit if determining that the interface corresponding to de-multiplexed data requires to be crossed with the previous level apparatus according to the cross relationships saved, and send the data to the MAC layer access control unit if determining that the interface corresponding to the de-multiplexed data does not have a cross relationship with other digital interfaces.

9. The Ethernet MAC layer cross apparatus of claim 8, further comprising: a cross cascade interface connected with a next level apparatus, and a second multiplex and de-multiplex processing unit connected between the cross cascade interface and the cross processing unit; wherein the cross processing unit is further configured to send the de-multiplexed data to the second multiplex and de-multiplex processing unit directly connected with the cross cascade interface if determining that the interface corresponding to the de-multiplexed data has a cross relationship with the cross cascade interface according to the cross relationships saved; and the second multiplex and de-multiplex processing unit connected between the cross cascade interface and the cross processing unit is configured to multiplex the data and send multiplex data to the cross cascade interface.

10. An Ethernet Internet Protocol, IP, layer cross apparatus, comprising:

a plurality of digital interfaces and an IP layer processing unit; and a first multiplex and de-multiplex processing unit and a cross processing unit; wherein the first multiplex and de-multiplex processing unit is configured to de-multiplex data outputted from the digital interfaces, send de-multiplexed data to the cross processing unit, and send data requiring to be crossed with a previous level apparatus received from the cross processing unit to a corresponding digital interface; and the cross processing unit is configured to save cross relationships between network device interfaces, send the data requiring to be crossed with the previous level apparatus and information of an interface corresponding to the data requiring to be crossed with the previous level apparatus to the first multiplex and de-multiplex processing unit if determining that the interface corresponding to the de-multiplexed data requires to be crossed with the previous level apparatus according to the cross relationships saved, and send the data to the IP layer processing unit if determining that interface corresponding to the de-multiplexed data does not have a cross relationship with other digital interfaces.

11. The Ethernet IP layer cross apparatus of claim 10, further comprising: a cross cascade interface connected with a next level apparatus, and a second multiplex and de-multiplex processing unit connected between the cross cascade interface and the cross processing unit; wherein the cross processing unit is further configured to send the data to the second multiplex and de-multiplex processing unit directly connected with the cross cascade interface if determining that the interface corresponding to the de-multiplexed data has a cross relationship with the cross cascade interface; and the second multiplex and de-multiplex processing unit connected between the cross cascade interface and the cross processing unit is configured to multiplex the data and send the multiplexed data to the cross cascade interface.

12. An Ethernet physical layer cross cascade system, comprising: a first level Ethernet physical layer cross apparatus, and at least one Ethernet physical layer cross apparatus cascaded with the first level Ethernet physical layer cross apparatus; wherein the first level Ethernet physical layer cross apparatus comprises;

a plurality of analog interfaces, a cross processing unit, a first multiplex and de-multiplex processing unit and a multiplex interface connected with the first multiplex and de-multiplex processing unit and an outside apparatus;

the first multiplex and de-multiplex processing unit comprises; a multiplex and de-multiplex processing unit of a cross interface and a multiplex and de-multiplex processing unit of a forwarding interface; the multiplex interface comprises; a cross multiplex interface connected with the multiplex and de-multiplex processing unit of the cross interface and a forwarding multiplex interface connected with the multiplex and de-multiplex processing unit of the forwarding interface; wherein the cross processing unit is configured to save cross relationships between network device interfaces; send data output from a first analog interface to a second analog interface if determining that the first analog interface has a cross relationship with the second analog interface according to the cross relationships saved when receiving the data outputted from the first analog interface; send the data outputted from the first analog interface to the multiplex and de-multiplex processing unit of the forwarding interface if determining that the first analog interface does not have a cross relationship with the second analog interface and other analog interfaces according to the cross relationships saved; and send the data outputted from the first analog interface to the multiplex and de-multiplex processing unit of the cross interface if determining that the first analog interface has a cross relationship with the cross multiplex interface according to the cross relationships saved; wherein the at least one Ethernet physical layer cross apparatus cascaded with the first level Ethernet physical layer cross apparatus comprises: the plurality of analog interfaces, the cross processing unit, the first multiplex and de-multiplex processing unit, the multiplex interface connected with the first multiplex and de-multiplex processing unit and the outside apparatus, and a second multiplex and de-multiplex processing unit; wherein the second multiplex and de-multiplex processing unit is coupled with the plurality of analog interfaces and the cross processing unit and configured to de-multiplex multiplexed data received from each analog interface, send de-multiplexed data to the cross processing unit, and send data requiring to be crossed with a previous level apparatus from the cross processing unit to a corresponding analog interface; wherein the cross processing unit is further configured to send the data requiring to be crossed with the previous level apparatus and information of the analog interface corresponding to the data requiring to be crossed with the previous level apparatus to the second multiplex and de-multiplex processing unit if determining that the interface corresponding to the de-multiplexed data requires to be crossed with the previous level apparatus according to the cross relationships saved.

13. The Ethernet physical layer cross cascade system of claim 12, wherein each of the Ethernet physical layer cross apparatus further comprises: a plurality of clock and coding/decoding processing units and a plurality of MAC layer interface processing units respectively corresponding to the analog interfaces and connected between the analog interface and the first multiplex and de-multiplex processing unit;

the cross processing unit is directly connected between the clock and coding/decoding processing units and the MAC layer interface processing units; and a MAC layer interface processing unit corresponding to the first analog interface is further configured to send the data to the multiplex and de-multiplex processing unit of the cross interface if receiving the data and cascade cross information from the cross processing unit, and send the data to the multiplex and de-multiplex processing unit of the forwarding interface if receiving the data from the cross processing unit.

14. The Ethernet physical layer cross cascade system of claim 12, a next level Ethernet physical layer cross apparatus further comprises:

a plurality of clock and coding/decoding processing units respectively corresponding to the analog interfaces and connected between the analog interfaces and the cross processing unit; wherein the second multiplex and de-multiplex processing unit is directly connected between the clock and coding/decoding processing units and the cross processing unit.

15. The Ethernet physical layer cross cascade system of claim 12, further comprising: a self-negotiation unit, configured to obtain at least one of transmission rate and multiplex manner respectively supported by each analog interface and each multiplex and de-multiplex processing unit of the previous level Ethernet physical layer cross apparatus and each multiplex and de-multiplex processing unit and the media access control port of the next level Ethernet physical layer cross apparatus, determine at least one of the transmission rate and multiplex manner used by each interface, and send the determined at least one of the transmission rate and multiplex manner to each analog interface and each multiplex and de-multiplex processing unit of the previous level Ethernet physical layer cross apparatus and each multiplex and de-multiplex processing unit and the media access control port of the next level Ethernet physical layer cross apparatus respectively.

16. The Ethernet physical layer cross cascade system of claim 12, wherein the multiplex and de-multiplex processing unit connected with the multiplex interface in each Ethernet physical layer cross apparatus comprises:

an interface identifier storage module, configured to store identifiers respectively corresponding to the analog interfaces in each Ethernet physical layer cross apparatus;

a frame multiplex module, configured to search in the interface identifier storage module for a first identifier corresponding to a first analog interface after receiving a first data from the first analog interface, carry the first identifier in the first data and send the first data to a cache processing module, send a second data received from the cache processing module carrying a second identifier to a second analog interface according to the second identifier carried in the second data and content stored in the interface identifier storage module;

the cache processing module, configured to cache the first data received from the frame multiplex module, convert transmission rate of the first data sent from the frame multiplex module according to transmission rate of the connected multiplex interface and send the first data to the multiplex interface; cache the second data carrying the second identifier received from the multiplex interface, convert the transmission rate of the second data carrying the second identifier according to transmission rate of the second analog interface, and send the second data to the frame multiplex module.

17. The Ethernet physical layer cross cascade system of claim 12, wherein the multiplex and de-multiplex cross apparatus connected with the multiplex interface in each Ethernet physical layer cross apparatus comprises:

a time slot identifier storage module, configured to store identifiers and time slots respectively corresponding to the analog interfaces in each Ethernet physical layer cross apparatus;

an identifier processing module, configured to read a first data of fixed length from a first analog interface at a corresponding time slot of the first analog interface according to content of the time slot identifier storage module, carry a first identifier corresponding to the first analog interface in the first data, send the first data to a byte multiplex module, send a second data carrying a second identifier of a second analog interface to the second analog interface according to the second identifier carried in the second data after receiving the second data from the byte multiplex module; and the byte multiplex module, configured to convert transmission rate of the first data sent from the identifier processing module according to transmission rate of the multiplex interface, send the first data to the multiplex interface, convert transmission rate of the second data carrying the second identifier received from the multiplex interface according to transmission rate of the second analog interface and send the second data to the identifier processing module.

18. A method for forwarding data in Ethernet, comprising:
configuring cross relationships between network device interfaces;
determining whether an interface has a cross relationship with other interfaces according to the cross relationships configured after receiving data from the interface;

sending the data to an interface which has a cross relationship with the interface from which the data is received if the interface from which the data is received has a cross relationship with other interfaces; and proceeding with existing forwarding processing in each layer if the interface from which the data is received does not have a cross relationship with other interfaces.

19. The method of claim 18, further comprising at least one of:

cascading a plurality of Ethernet physical layer cross apparatuses;

cascading a plurality of Ethernet Media Access Control, MAC, layer cross apparatus; and cascading a plurality of Ethernet IP layer cross apparatus; wherein each of the cascaded Ethernet physical layer cross apparatus, each of the cascaded Ethernet MAC layer cross apparatus, and each of the cascaded Ethernet IP layer cross apparatus performs the processing of the receiving, determining and sending.

20. The method of claim 18, when the Ethernet physical layer cross apparatus performs the processing of the determining and sending, after receiving the data from the interface and before determining according to the cross relationships configured, further comprising;

performing, by the Ethernet physical layer cross apparatus, A/D conversion processing and clock and coding/decoding processing to the data received from the interface; and when the Ethernet MAC layer cross apparatus or the Ethernet IP layer cross apparatus performs the processing of the determining and sending, after receiving the data from the interface and before determining according to the cross relationships configured, further comprising;

de-multiplexing, by the Ethernet MAC layer cross apparatus or the Ethernet IP layer cross apparatus, the data received from the interface.

21. The method of claim 18, wherein configuring the cross relationships between the network device interfaces comprises:

determining a first user terminal and a second user terminal having a fixed path relationship;

configuring a cross relationship between a first network device interface connected with the first user terminal and a second network device interface connected with the second user terminal.

* * * * *